United States Patent
Bouzguarrou et al.

(10) Patent No.: US 12,373,218 B2
(45) Date of Patent: Jul. 29, 2025

(54) TECHNIQUE FOR PREDICTING BEHAVIOUR OF CONTROL FLOW INSTRUCTIONS

(71) Applicant: Arm Limited, Cambridge (GB)

(72) Inventors: Houdhaifa Bouzguarrou, Austin, TX (US); Alexander Cole Shulyak, Austin, TX (US); Rami Mohammad Al Sheikh, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/454,158

(22) Filed: Aug. 23, 2023

(65) Prior Publication Data

US 2025/0068427 A1 Feb. 27, 2025

(51) Int. Cl.
*G06F 9/38* (2018.01)
*G06F 9/30* (2018.01)

(52) U.S. Cl.
CPC ........ *G06F 9/3844* (2013.01); *G06F 9/30047* (2013.01); *G06F 9/30145* (2013.01)

(58) Field of Classification Search
CPC . G06F 9/3844; G06F 9/30145; G06F 9/30047
See application file for complete search history.

(56) References Cited

U.S. PATENT DOCUMENTS 6,006,317 A 12/1999 Ramagopal et al.
6,694,425 B1 2/2004 Eickemeyer
(Continued)

OTHER PUBLICATIONS

Notice of Allowance dated Aug. 22, 2024 for U.S. Appl. No. 18/312,052, 15 pages.
(Continued)

*Primary Examiner* — Zachary K Huson
(74) *Attorney, Agent, or Firm* — NIXON & VANDERHYE P.C.

(57) ABSTRACT

An apparatus has pointer storage to store pointer values for a plurality of pointers and increment circuitry, responsive to a series of increment events, to differentially increment the pointer values of the pointers. Training circuitry comprises tracker circuitry to maintain a plurality of tracker entries and cache circuitry to maintain a plurality of cache entries. Each tracker entry identifies a control flow instruction, and each cache entry stores a resolved behaviour of an instance of a control flow instruction identified by a tracker entry. For a given control flow instruction identified in a given tracker entry, the training circuitry performs a training process to seek to determine, as an associated pointer for the given control flow instruction, a pointer from amongst the plurality of pointers whose pointer value increments in a manner that meets a correlation threshold with occurrence of instances of the given control flow instruction. Promotion circuitry, responsive to detection of the correlation threshold being met for the given control flow instruction, allocates a prediction entry within prediction circuitry to identify the given control flow instruction and the associated pointer, and a behaviour record is established within the prediction entry identifying the resolved behaviour for one or more instances of the given control flow instruction. The behaviour record is arranged such that each resolved behaviour is associated with the pointer value of the associated pointer at the time that resolved behaviour was observed. Responsive to a prediction trigger associated with a replay of a given instance of the given control flow instruction, the prediction circuitry determines, in dependence on a current pointer value of the associated pointer, a predicted behaviour of the given instance of the given control flow instruction from the behaviour record within the prediction entry.

20 Claims, 22 Drawing Sheets

(56) References Cited

U.S. PATENT DOCUMENTS

| | | |
|---|---|---|
| 8,751,776 B2 | 6/2014 | Ukai |
| 9,891,918 B2 | 2/2018 | Hooker et al. |
| 9,973,187 B1 | 5/2018 | Pant et al. |
| 10,223,123 B1 | 3/2019 | Blasco et al. |
| 10,846,097 B2 | 11/2020 | Jumani et al. |
| 11,334,361 B2 | 5/2022 | Ishii et al. |
| 2004/0255104 A1 | 12/2004 | Akkary et al. |
| 2005/0138480 A1 | 6/2005 | Srinivasan et al. |
| 2011/0238917 A1 | 9/2011 | Lin |
| 2015/0095627 A1* | 4/2015 | Dechene .............. G06F 9/3887 712/228 |
| 2016/0092230 A1 | 3/2016 | Chen |
| 2016/0350116 A1 | 12/2016 | Reddy et al. |
| 2016/0371089 A1* | 12/2016 | Ma ...................... G06F 9/3836 |
| 2017/0010820 A1 | 1/2017 | Day |
| 2018/0088953 A1 | 3/2018 | Lin |
| 2020/0050459 A1 | 2/2020 | Palivela |
| 2020/0104137 A1 | 4/2020 | Natarajan |
| 2020/0110615 A1* | 4/2020 | Ishii ..................... G06F 9/3861 |
| 2020/0174794 A1 | 6/2020 | Golla |
| 2021/0081575 A1 | 3/2021 | Saileshwar |
| 2021/0124586 A1 | 4/2021 | Bouzguarrou |
| 2021/0240476 A1 | 8/2021 | Kountanis |
| 2022/0197650 A1 | 6/2022 | Soundararajan |
| 2023/0057600 A1 | 2/2023 | Malley |

OTHER PUBLICATIONS

U.S. Appl. No. 17/851,266, filed Jun. 28, 2022, Shul Yak et al.
U.S. Appl. No. 18/312,052, filed May 4, 2023, Shul Yak et al.
U.S. Appl. No. 18/454,165, filed Aug. 23, 2023, Bouzguarrou et al.
U.S. Appl. No. 18/462,742, filed Sep. 7, 2023, Bouzguarrou et al.
Office Action dated Aug. 9, 2023 for U.S. Appl. No. 17/851,266, 11 pages.
Akkary, H et al. "Recycling Waste: Exploiting Wrong-Path Execution to Improve Branch Prediction" ICS'03, Jun. 23-26, 2003, pp. 12-21 (10 pages).
Mutlu, O. et al. "On Reusing the Results of Pre-Executed Instructions in a Runahead Execution Processor" IEEE Computer Architecture Letters, 2005, vol. 4 (4 pages).
Office Action dated May 6, 2025 for U.S. Appl. No. 18/454,165.
Zi-Chao Xie et al, "SWIP Prediction: Complexity-Effective Indirect-Branch Prediction Using Pointers" Journal of Computer Science and Technology, vol. 27, No. 4, Jul. 2012, pp. 754-768.

* cited by examiner

```
for (i = 0; i < N; i++){
        if (hard_to_predict){           // Branch A
                if (data[i]){           // Branch B
                        ...
                }
        }
}
```

FIG. 2

```
if (long_latency_hard_to_predict){
        ...
} if (short_latency_hard_to_predict){
        ....
}
```

FIG. 3

```
for (i=0; i < N; i++){
        if (long_latency_hard_to_predict){      // Branch A
                ...
        } if (short_latency_hard_to_predict){     // Branch B
                ...
        }
}
```

FIG. 4A short[i=0] = T     long[i=0] = T
short[i=1] = T     long[i=1] = N*
short[i=2] = N     long[i=2] = ?
short[i=3] = T     long[i=3] = ?

FIG. 4B

```
for (i=0; i < N; i++){
        for (j=0; j < N; j++){     // Loop iteration count hard to predict
                ...
        }
}
if (hard_to_predict){              // Branch A
        ...
}
```

FIG. 5

TECHNIQUE FOR PREDICTING BEHAVIOUR OF CONTROL FLOW INSTRUCTIONS

BACKGROUND

The present technique relates to the area of data processing, and more particularly to control flow prediction.

In a data processing system, instructions can be executed speculatively. For example, conditional control flow instructions determine which sequence of later instructions (control flow path) will subsequently be executed. A particular example of a conditional control flow instruction is a conditional branch instruction. In such systems, execution of a conditional control flow instruction can involve predicting the conditional control flow instruction's outcome before the instruction has been executed. This allows the data processing system to speculatively execute later instructions on the control flow path indicated by the predicted outcome of the control flow instruction. Speculative execution of instructions in this way allows the later instructions to be executed sooner than would be possible if the data processing system was forced to wait until the outcome of the earlier instruction was known, which may improve the performance of the data processing system. If the prediction of the outcome of a conditional control flow instruction is later determined to have been incorrect, the later instructions executed from the incorrect control flow path are flushed from the pipeline of the data processing system, with the data processing system then executing instructions on the correct control flow path.

It is desirable to develop prediction mechanisms that increase the accuracy of prediction of the outcome of control flow instructions, as the more accurately the prediction mechanism operates, the less need there will be to flush instructions from the pipeline, and hence the performance impact of incorrect predictions will be reduced.

SUMMARY

In a first example arrangement, there is provided an apparatus comprising: pointer storage to store pointer values for a plurality of pointers; increment circuitry, responsive to a series of increment events, to differentially increment the pointer values of the pointers; training circuitry comprising tracker circuitry to maintain a plurality of tracker entries and cache circuitry to maintain a plurality of cache entries, each tracker entry to identify a control flow instruction, and each cache entry to store a resolved behaviour of an instance of a control flow instruction identified by a tracker entry of the tracker circuitry; wherein the training circuitry is arranged, for a given control flow instruction identified in a given tracker entry, to perform a training process to seek to determine, as an associated pointer for the given control flow instruction, a pointer from amongst the plurality of pointers whose pointer value increments in a manner that meets a correlation threshold with occurrence of instances of the given control flow instruction; prediction circuitry; and promotion circuitry, responsive to detection of the correlation threshold being met for the given control flow instruction, to allocate a prediction entry within the prediction circuitry to identify the given control flow instruction and the associated pointer, and to establish within the prediction entry a behaviour record identifying the resolved behaviour for one or more instances of the given control flow instruction, where the behaviour record is arranged such that each resolved behaviour is associated with the pointer value of the associated pointer at the time that resolved behaviour was observed; wherein the prediction circuitry, responsive to a prediction trigger associated with a replay of a given instance of the given control flow instruction, is arranged to determine, in dependence on a current pointer value of the associated pointer, a predicted behaviour of the given instance of the given control flow instruction from the behaviour record within the prediction entry.

In another example arrangement, there is provided a method of predicting behaviour of control flow instructions, comprising: maintaining pointer values for a plurality of pointers and, responsive to a series of increment events, differentially increment the pointer values of the pointers; employing training circuitry comprising tracker circuitry to maintain a plurality of tracker entries and cache circuitry to maintain a plurality of cache entries, each tracker entry for identifying a control flow instruction, and each cache entry for storing a resolved behaviour of an instance of a control flow instruction identified by a tracker entry of the tracker circuitry; performing a training process, for a given control flow instruction identified in a given tracker entry, to seek to determine, as an associated pointer for the given control flow instruction, a pointer from amongst the plurality of pointers whose pointer value increments in a manner that meets a correlation threshold with occurrence of instances of the given control flow instruction; responsive to detection of the correlation threshold being met for the given control flow instruction, allocating a prediction entry within prediction circuitry to identify the given control flow instruction and the associated pointer, and establishing within the prediction entry a behaviour record identifying the resolved behaviour for one or more instances of the given control flow instruction, where the behaviour record is arranged such that each resolved behaviour is associated with the pointer value of the associated pointer at the time that resolved behaviour was observed; and employing the prediction circuitry, responsive to a prediction trigger associated with a replay of a given instance of the given control flow instruction, to determine, in dependence on a current pointer value of the associated pointer, a predicted behaviour of the given instance of the given control flow instruction from the behaviour record within the prediction entry.

In a still further example arrangement, there is provided a computer-readable medium to store computer-readable code for fabrication of a data processing apparatus comprising: pointer storage to store pointer values for a plurality of pointers; increment circuitry, responsive to a series of increment events, to differentially increment the pointer values of the pointers; training circuitry comprising tracker circuitry to maintain a plurality of tracker entries and cache circuitry to maintain a plurality of cache entries, each tracker entry to identify a control flow instruction, and each cache entry to store a resolved behaviour of an instance of a control flow instruction identified by a tracker entry of the tracker circuitry; wherein the training circuitry is arranged, for a given control flow instruction identified in a given tracker entry, to perform a training process to seek to determine, as an associated pointer for the given control flow instruction, a pointer from amongst the plurality of pointers whose pointer value increments in a manner that meets a correlation threshold with occurrence of instances of the given control flow instruction; prediction circuitry; and promotion circuitry, responsive to detection of the correlation threshold being met for the given control flow instruction, to allocate a prediction entry within the prediction circuitry to identify the given control flow instruction and the associated pointer, and to establish within the prediction entry a behaviour record identifying the resolved behaviour for one or more instances of the given control flow instruction, where the behaviour record is arranged such that each resolved behaviour is associated with the pointer value of the associated pointer at the time that resolved behaviour was observed; wherein the prediction circuitry, responsive to a prediction trigger associated with a replay of a given instance of the given control flow instruction, is arranged to determine, in dependence on a current pointer value of the associated pointer, a predicted behaviour of the given instance of the given control flow instruction from the behaviour record within the prediction entry. Such computer-readable code can be disposed in any known transitory computer-readable medium (such as wired or wireless transmission of code over a network) or non-transitory computer-readable medium such as semiconductor, magnetic disk, or optical disc.

In a yet further example arrangement there is provided a system comprising: the apparatus according to the above-mentioned first example arrangement, implemented in at least one packaged chip; at least one system component; and a board, wherein the at least one packaged chip and the at least one system component are assembled on the board.

In a still further example arrangement there is provided a chip-containing product comprising the above-mentioned system assembled on a further board with at least one other product component.

BRIEF DESCRIPTION OF THE DRAWINGS

The present technique will be described further, by way of illustration only, with reference to examples thereof as illustrated in the accompanying drawings, in which:

FIG. 2 illustrates an example of a guard instruction;

FIG. 3 illustrates an example of hard to predict instructions having different latencies;

FIG. 4A shows an example in which a FOR loop contains a long latency branch instruction and a short latency branch instruction, whilst FIG. 4B shows the corresponding storage that can be used to perform replay prediction;

FIG. 5 shows how FOR loop indexing can be polluted;

DESCRIPTION OF EXAMPLES

Figure 1:
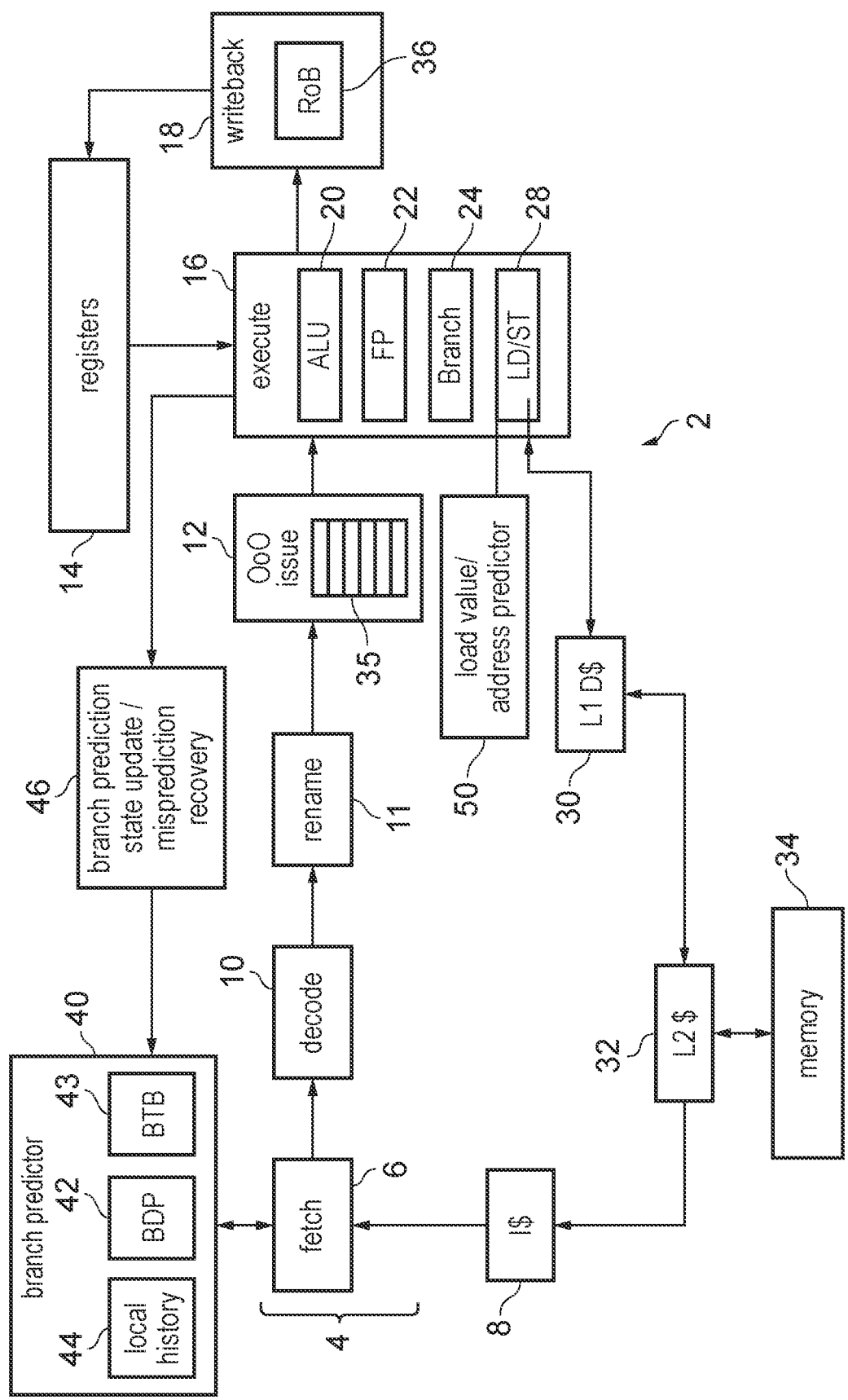
FIG. 1 schematically illustrates an example of a data processing apparatus.

Rather than using global history for control flow (e.g. branch) instruction prediction, one could consider the history of other recently executed branch instructions. This, however, can be problematic in the face of out-of-order execution in which a later branch prediction is rewound due to an earlier branch instruction being mispredicted. In this case, the series of branch outcomes taken to get to the later branch instruction will be different in each case and so the previous execution of the later branch instruction does not help.

Replay prediction makes it possible to use the previous execution result (behaviour) of a branch instruction that was rewound due to a misprediction of an earlier instruction. This is particularly useful in the case of program loops (such as FOR loops) where an iteration of the FOR loop might be repeated due to rewinding. In this case, if the previous execution result of a branch instruction is kept, this result could serve as a reasonable prediction of the branch instruction's behaviour when the same iteration number is re-reached. However, it remains difficult to tell, at a hardware level, which iteration a loop is in. This is because, at the instruction level, all that is seen are branch instructions, which might be branches or loops. Further complicating this is the fact that certain program structures can make it difficult to count the loop iteration number. It would therefore be desirable to provide a replay prediction mechanism that can enable replay prediction to occur more accurately. It would also be desirable to produce an area efficient design, so as for example to allow a larger number of control flow instructions to be tracked by the replay prediction mechanism for a given size/area cost associated with the provision of the replay prediction mechanism.

In accordance with one example implementation, an apparatus is provided that has pointer storage to store pointer values for a plurality of pointers, and increment circuitry that is responsive to a series of increment events to differentially increment the pointer values of the pointers. This approach provides a pool of pointers whose values are incremented in response to increment events, but where the evaluation of whether and/or how to increment the value of any given pointer in response to any given increment event is performed such that over time the pointer values of the different pointers will increment differently with respect to each other. Hence, over time the pointers will take different values dependent on the observed increment events. As will be apparent from the subsequent discussion, the aim is to seek to associate, with any given control flow instruction that is seeking to be tracked, one of the pointers, and in particular to seek to identify a pointer whose pointer value is incremented in a way that correlates with occurrences of the given control flow instruction, or put another way a pointer whose pointer value will increment at the same rate at which any encapsulating loop containing the given control flow instruction iterates.

In accordance with the techniques described herein, the apparatus also has training circuitry comprising tracker circuitry to maintain a plurality of tracker entries and cache circuitry to maintain a plurality of cache entries. Each tracker entry is arranged to be used to identify a control flow instruction, and each cache entry is then used to store a resolved behaviour of an instance of a control flow instruction identified by a tracker entry of the tracker circuitry. In some example implementations the resolved behaviour is stored in the cache entry along with an associated tag value generated in dependence on a chosen pointer when the resolved behaviour was allocated into that cache entry. The training circuitry is arranged, for a given control flow instruction identified in a given tracker entry, to perform a training process to seek to determine, as an associated pointer for the given control flow instruction, a pointer from amongst the plurality of pointers whose pointer value increments in a manner that meets a correlation threshold with occurrence of instances of the given control flow instruction.

By such an approach, the cache circuitry is used as a shared cache structure in which to maintain the resolved behaviours of each of the control flow instructions being tracked by the tracker entries of the tracker circuitry, which can lead to a very efficient design when compared with an approach that instead seeks to maintain separate storage structures for each of the tracked control flow instructions into which to store the resolved behaviours of those tracked control flow instructions. In particular, for a given area/size, it is possible using the approach described above to track a larger number of control flow instructions than would be possible were separate storage structures required to be maintained for each of the tracked control flow instructions in order to store their resolved behaviours. Further, the use of the shared cache structure provides enhanced flexibility, as the amount of history (the number of resolved behaviours) that can be maintained for any given tracked control flow instruction can be varied dependent on the total number of control flow instructions being tracked at any point in time.

In situations where the training process does result in the identification of an associated pointer for a given control flow instruction whose pointer value increments in a manner that meets the above-mentioned correlation threshold with occurrences of instances of the given control flow instruction, then it would be possible to use the contents of the training circuitry, and in particular the resolved behaviours stored within the cache circuitry, to make predictions for the outcome of given instances of that given control flow instruction. This can enable accurate predictions to be made of the outcome of the given control flow instruction during multiple iterations of an encapsulating loop. However, it has been found that in many practical systems, it is necessary to be able to provide high prediction bandwidth, for example to be able to make predictions for multiple branch instructions per clock cycle, and it has been found that it can be problematic seeking to achieve the required prediction bandwidth using the above described training circuitry.

In accordance with the techniques described herein, this problem is alleviated through the use of separate prediction circuitry that can be coupled to the above-mentioned training circuitry, and into which a given control flow instruction being tracked by the tracker circuitry can be promoted once the training process has identified a suitable associated pointer for a given control flow instruction. In particular, in accordance with the techniques described herein, promotion circuitry is provided that is responsive to detection of the correlation threshold being met for the given control flow instruction, to allocate a prediction entry within the prediction circuitry to identify the given control flow instruction and the associated pointer. Further, a behaviour record is established within the allocated prediction entry identifying the resolved behaviour for one or more instances of the given control flow instruction. The behaviour record is arranged such that each resolved behaviour is associated with the pointer value of the associated pointer at the time that resolved behaviour was observed.

Thereafter, the prediction circuitry can be arranged, in response to a prediction trigger associated with a replay of a given instance of the given control flow instruction, to determine, in dependence on a current pointer value of the associated pointer, a predicted behaviour of the given instance of the given control flow instruction from the behaviour record within the prediction entry.

By arranging the apparatus to have both training circuitry and prediction circuitry of the form described above, with promotion circuitry controlling the allocation of control flow instructions into prediction entries of the prediction circuitry once the training process performed by the training circuitry has found suitable associated pointers for those control flow instructions (i.e. pointers whose pointer values increment in a manner that meets the earlier-mentioned correlation threshold), it has been found that this can lead to a particularly power efficient and low area apparatus while still being able to achieve good prediction bandwidth. In particular, since the training circuitry is no longer required to be used to make predictions, and hence is not constrained by the need for high prediction bandwidth, the size of the training circuitry can be reduced. Thus, a high-capacity training circuitry design can be provided in order to enable a desired number of control flow instructions to be tracked, but due to the fact that the training circuitry does not need to meet the performance requirements associated with the desired prediction bandwidth, it is possible to adopt more size efficient topologies for the design of the tracker circuitry and cache circuitry making up the training circuitry. For example, it is possible to use a set associative storage structure for the tracker circuitry (for example a two-way set associative storage structure), which can significantly reduce the size requirements when compared with an equivalent fully associative storage structure (if the tracker circuitry were to be used to make predictions directly, then the prediction bandwidth requirements would likely necessitate that a fully associative or very highly associative storage structure be used in order to meet the performance needs). Hence, this can enable the size of the training structure to be reduced when compared with a training structure that was also required to be used to make predictions. Such an approach can also reduce the power consumption requirements of the training circuitry.

In addition, it is also possible to make the prediction circuitry relatively small, since the training circuitry performs a filtering function, and in particular a control flow instruction is only allocated into the prediction circuitry when the training process performed within the training circuitry has identified a suitable associated pointer for that control flow instruction, and in particular has found an associated pointer whose pointer value increments in a manner that meets a given correlation threshold, and hence is likely to be usable to make accurate predictions. The prediction circuitry can hence be configured for high bandwidth, and in particular can be arranged to meet the required prediction bandwidth (i.e. make the required number of predictions per clock cycle).

Overall, such an approach enables a high capacity and high prediction bandwidth apparatus to be produced, with reduced area and power consumption. The training circuitry can be used to track a relatively large number of control flow instructions, and via the training process seek to identify appropriate pointers to associate with those control flow instructions. For those control flow instructions where a suitable pointer has been found that is expected to enable accurate predictions to be made, then those control flow instructions can be promoted into the prediction circuitry, with the prediction circuitry able to provide high prediction throughput performance.

In one example implementation where each cache entry is arranged to store a resolved behaviour of an instance of a control flow instruction identified by a tracker entry of the tracker circuitry along with an associated tag value generated in dependence on a chosen pointer when the resolved behaviour was allocated into that cache entry, the training circuitry may be arranged to store the resolved behaviour of an instance of the given control flow instruction in multiple cache entries using associated tag values generated using different chosen pointers from the plurality of pointers, and to reference the multiple cache entries during the training process when seeking to determine whether there is a pointer whose pointer value increments in a manner that meets the correlation threshold. In one example implementation, the pointers being used at any particular point in time can be identified in the relevant tracker entries, and hence different pointers can be associated with different tracker entries. The training process can be performed independently for each of the control flow instructions being tracked, and can be performed in parallel for each of those various control flow instructions, with the shared cache structure being used to store the various resolved behaviours that are referenced during the training process.

In one particular example implementation, for each tracker entry, that tracker entry will identify both a current active pointer and a current training pointer, and when a resolved behaviour of an instance of the associated control flow instruction is observed, that resolved behaviour will be stored in one cache entry with an associated tag value generated based on the current active pointer, and in another cache entry with an associated tag value generated based on the current training pointer.

The behaviour record maintained within a prediction entry into which a control flow instruction has been allocated can take a variety of forms, but in one example implementation the behaviour record provides a vector of elements, where each element is for storing a resolved behaviour. During access to the behaviour record a pointer value of the associated pointer is used to identify one of the elements in the vector of elements. The behaviour record may be accessed for a variety of reasons. For example, when a new resolved behaviour is observed for a control flow instruction allocated into a prediction entry, then an element of the vector of elements forming the behaviour record may be identified using a value of the associated pointer, and that identified element can be accessed in order to update the behaviour record to reflect the new resolved behaviour that has been observed. Similarly, when seeking to make a prediction using the prediction entry, the behaviour record may again be accessed using a current value of the associated pointer in order to identify which element in the vector of elements forming the behaviour record is to be used to make the prediction.

There are various ways in which the behaviour record may be populated in response to a prediction entry being allocated for a given control flow instruction. For instance, in one implementation the behaviour record may be populated at the time the prediction entry is allocated, for example by retrieving from the cache circuitry the resolved behaviour for one or more instances of the given control flow instruction. The behaviour record can hence effectively be pre-populated such that it can then immediately start to be used for making future predictions.

However, in an alternative example implementation, the behaviour record may instead be populated after the prediction entry has been allocated, using the resolved behaviour for one or more subsequently observed instances of the given control flow instruction. Hence, when adopting such an approach, it will take a period of time for the behaviour record to be populated to a point where it can actively be used to make predictions. However, such an approach avoids the complexity of needing to make multiple accesses to the cache circuitry in order to seek to retrieve information from the cache circuitry for populating the behaviour record within the prediction entry. As a yet further example approach, it will be appreciated that a hybrid approach could be taken, where the behaviour record could be at least partly populated using information retrieved from the cache circuitry, but could then be supplemented in response to each subsequently observed instance of the given control flow instruction.

The information maintained by the prediction entry may be varied dependent on implementation, but in one example implementation the prediction entry maintains a confidence value, and generation by the prediction circuitry of the predicted behaviour of the given instance of the given control flow instruction in response to the prediction trigger requires the confidence value to exceed a confidence threshold. The confidence value can be maintained in a variety of ways, but in one example implementation may be initialised to a given value at the time the prediction entry is allocated. There are various ways in which the given value may be chosen, but in one particular example implementation it may be set to match a confidence indication maintained in association with the associated pointer in the tracker entry of the training circuitry that has caused the allocation of the prediction entry to take place.

As mentioned earlier, the allocation can be arranged to take place once it has been determined that a correlation threshold has been met for a given control flow instruction being tracked in a tracker entry of the training circuitry, and that correlation threshold may be chosen such that meeting of the correlation threshold indicates that there is a sufficiently high enough confidence in the associated pointer that it is expected that accurate predictions could be made using that pointer in association with the control flow instruction, and hence the given value to which the confidence value is initialised at the time the prediction entry is allocated may be a value sufficient to identify that the confidence threshold has been met. However, in one example implementation, after the prediction entry has been allocated, the prediction circuitry may be arranged to continue to monitor the resolved behaviours of subsequently observed instances of the given control flow instruction and to update the confidence value in the prediction entry dependent on whether the predicted behaviour obtained using the prediction entry matches the actual observed behaviour, and as a result the confidence value may increase and/or decrease over time. If it decreases to a point that indicates that the confidence threshold is no longer met, then at that point the prediction circuitry may cease to use the prediction entry to make subsequent predictions of the predicted behaviour of the control flow instruction identified in that prediction entry, although it could again resume making predictions for the control flow instruction identified in the prediction entry if in due course the confidence value increases again to a point that indicates that the confidence threshold has again been met.

As noted above, in one example implementation the prediction circuitry may be arranged to update the confidence value and the behaviour record based on the resolved behaviour for one or more subsequently observed instances of the given control flow instruction. There are various advantages to adopting such an approach. In particular, this allows the prediction circuitry to continue a training process after allocation of a prediction entry has taken place. This in turn can support optional features that provide further flexibility in how the apparatus is used. For example, this could allow turning off of the training circuitry following an initial allocation into the prediction circuitry, or indeed could allow direct allocations into the prediction circuitry following a misprediction trigger, for example if the training circuitry is turned off. Such a misprediction trigger could take a variety of forms, but could for example be deemed to occur when a certain level of misprediction is observed for a given control flow instruction using a default prediction mechanism. Furthermore, as noted above, by continuing to train the prediction entries after they have been allocated, this can allow the prediction circuitry to stop making predictions in respect of certain control flow instructions if the associated confidence drops below an acceptable level after allocation into the prediction circuitry has taken place.

As discussed earlier, each cache entry within the cache circuitry of the training circuitry may be used to store a resolved behaviour of an instance of a control flow instruction along with an associated tag value that is generated in dependence on a chosen pointer when the resolved behaviour was allocated into that cache entry. One example of a chosen pointer would be the earlier mentioned current active pointer identified within the relevant tracker entry whilst another example of the chosen pointer would be the earlier mentioned current training pointer identified within the relevant tracker entry. In one example implementation, the apparatus comprises tag value generation circuitry that is used to generate the associated tag value in dependence on an identifier of the chosen pointer, a current pointer value of the chosen pointer, and an identifier for the control flow instruction for which the associated tag value is being generated. Hence, in such an implementation a number of different pieces of information influence the associated tag value that is generated, and in particular the tag value will vary dependent on the actual pointer that is chosen, the value of that pointer, and the control flow instruction whose resolved behaviour is to be stored within the cache circuitry.

There are various ways in which an identifier for the control flow instruction can be provided to the tag value generation circuitry. For example, in one implementation at least a portion of the memory address at which the control flow instruction is stored may be used as an identifier for the control flow instruction, such an identifier being referred to herein as a program counter (PC) based identifier. However, in accordance with one example implementation it has been determined that it is sufficient to provide, as an identifier of the control flow instruction for which an associated tag value is being generated, an identifier of the tracker entry that is used to identify/track that control flow instruction. Such an approach can enable the size of the cache circuitry to be reduced, as the identifier of the tracker entry will typically be smaller than a PC-based identifier of the control flow instruction and hence less space will be required within the cache to hold the associated tag values. Further, it has been found that such a physical identifier of the tracker entry is sufficient and stable enough to use when generating a tag value, since once a control flow instruction has been allocated to a tracker entry, it can remain allocated in that same tracker entry for a relatively long time, for example at least until an associated pointer has been found during the training process that enables the correlation threshold to be met, and hence causes promotion of the control flow instruction into the prediction circuitry.

The cache circuitry can be arranged to use any suitable replacement policy when allocating cache entries. For example, a round-robin scheme could be used, or alternatively a time stamp based scheme (for example a least recently allocated or least recently updated scheme) could be used to identify a victim entry whose contents are to be overwritten by new data (due to the victim entry being chosen as the allocated entry for that new data).

The tag value generation function applied by the tag value generation circuitry can take a variety of forms, but in one example implementation takes the form of a hash function. Any suitable hash function can be used, and indeed the form of hash function, and/or the number of bits forming the generated tag value, can be varied dependent on implementation, for example with the aim of reducing any potential aliasing issue (as could arise were different combinations of control flow instruction identifier values, pointer identifiers and pointer values to produce the same tag value).

The information maintained within each tracker entry of the tracker circuitry of the training circuitry can take a variety of forms, but in one example implementation each tracker entry is arranged to identify a current active pointer to be associated with the control flow instruction identified by that tracker entry and an active pointer confidence indication for the current active pointer, wherein the current active pointer is selected from amongst the plurality of pointers. In one such example implementation, the correlation threshold is then determined to be met when the active pointer confidence indication indicates that a given threshold confidence level has been met for the current active pointer.

There are various ways in which the active pointer confidence indication could be updated. In one example implementation, each time a resolved behaviour is provided for the given control flow instruction being tracked in a given tracker entry, the cache circuitry is arranged to perform a lookup operation using a comparison tag value that is generated using an identifier of the given control flow instruction, an identifier of the current active pointer and the current value of that current active pointer. In the event of the comparison tag value matching the associated tag value stored in an accessed entry of the plurality of cache entries, the tracker circuitry is arranged to update the active pointer confidence indication in the tracker entry for the given control flow instruction in dependence on whether the provided resolved behaviour matches the resolved behaviour stored in the accessed entry.

Which cache entries are accessed during any particular lookup operation may vary dependent on the organisation of the cache structure. For example, if the cache structure is arranged as a fully associative cache, then all of the cache entries may be accessed during the lookup operation in order to determine whether there is a hit condition (i.e. an entry whose stored associated tag value matches the comparison tag value used during the lookup operation) whereas for a set associative cache a single set within the cache structure may be identified, and each of the cache entries within that set may then be accessed.

There are various ways in which the tracker circuitry may update the active pointer confidence indication of a given tracker entry. In one example implementation, the tracker circuitry is arranged to update the active pointer confidence indication in the tracker entry for the given control flow instruction to indicate an enhanced confidence when the provided resolved behaviour matches the resolved behaviour stored in the accessed entry, and to otherwise update the active pointer confidence indication in the tracker entry for the given control flow instruction to indicate a decreased confidence. In an alternative implementation, it may be decided to update the active pointer confidence indication to indicate an enhanced confidence when the provided resolved behaviour matches the resolved behaviour stored in the accessed entry, but otherwise not to make any update to the active pointer confidence indication.

In one example implementation, the decision as to whether to adjust the active pointer confidence indication to indicate an enhanced or decreased confidence may be dependent on one or more additional factors. For example, the tracker circuitry may be arranged to inhibit update of the active pointer confidence indication in the tracker entry for the given control flow instruction when the resolved behaviour stored in the accessed entry indicates the same behaviour as would be predicted by a reference prediction mechanism. In particular, in one example implementation it will be the case that the reference prediction mechanism will be used by default, and the replay mechanism described herein will then only be employed if the reference prediction mechanism is proving not to be sufficiently accurate. In such cases, it can be beneficial to only update the active pointer confidence indication in situations where the resolved behaviour stored in the accessed entry, if used for prediction, would result in a different prediction to that that would be obtained from the reference prediction mechanism. The reference prediction mechanism could take a variety of forms, but in one example implementation could take the form of a TAGE (TAgged GEometric length) predictor, a TAGE predictor employing several predictor tables indexed through independent functions of the global branch/path history and the branch address. A TAGE predictor can provide reliable predictions in many instances, but may not be able to provide reliable predictions for certain control flow instructions (which may be referred to herein as hard to predict (HTP) control flow instructions), and it has been found that the replay prediction mechanism described herein can enable more reliable predictions to be made for such HTP control flow instructions.

In one example implementation, each tracker entry in the tracker circuitry of the training circuitry is further arranged to identify a current training pointer to be associated with the control flow instruction identified by that tracker entry and a training pointer confidence indication for the current training pointer, wherein the current training pointer is selected from amongst the plurality of pointers. For the given control flow instruction, the resolved behaviour of a given instance of that given control flow instruction may then be allocated into a first cache entry along with a first associated tag value generated in dependence on the current active pointer and into a second cache entry along with a second associated tag value generated in dependence on the current training pointer.

Typically, the current training pointer will differ from the current active pointer and the aim of the training process is to determine whether the current training pointer produces more accurate results than the current active pointer, and hence should be used as a new current active pointer in place of the existing current active pointer.

To achieve this, then in one example implementation, each time a resolved behaviour is provided for the given control flow instruction, the cache circuitry is arranged to perform a further lookup operation using a further comparison tag value generated in dependence on an identifier of the given control flow instruction, an identifier of the current training pointer and the current value of that current training pointer, and in the event of the further comparison tag value matching the associated tag value stored in a further accessed entry of the plurality of cache entries accessed during the further lookup operation, the tracker circuitry is arranged to update the training pointer confidence indication in the tracker entry for the given control flow instruction in dependence on whether the provided resolved behaviour matches the resolved behaviour stored in the further accessed entry. In one example implementation, the training pointer confidence indication is updated using the same criteria as employed to decide whether to update the active pointer confidence indication as discussed earlier.

Hence, it will be appreciated that, in accordance with such an approach, each time a resolved behaviour is provided for the given control flow instruction, two lookup procedures may be performed, one using the current active pointer and one using the current training pointer, and the relevant confidence indications may be updated accordingly in dependence on the outcome of those lookup operations. In one example implementation, if only one of the two lookup operations results in the associated confidence indication needing to be incremented, and that associated confidence indication is already at a saturated level, then instead the other confidence indication can be decremented.

In accordance with the above described approach, then at some point an assessment needs to be made as to whether the current training pointer is performing better than the current active pointer (i.e. has a confidence indication greater than the confidence indication of the current active pointer). In accordance with one example implementation, this is achieved by arranging each tracker entry to further identify a training counter which is incremented in response to each occurrence of a training event. The training event can take a variety of forms, but in one particular example implementation the training event is determined to occur whenever an update is made to at least one of the active pointer confidence indication and the training pointer confidence indication of the associated tracker entry. Hence, each time a provided resolved behaviour triggers the above described lookup process within the cache, then the training counter may be arranged to be incremented provided at least one of the active pointer confidence indication and the training pointer confidence indication is updated as a result of that lookup process.

In accordance with one example implementation, then following elapse of a training period (which in one example implementation may be deemed to occur in response to the training counter reaching a determined threshold for a given tracker entry), the tracker circuitry may be arranged to determine whether the training pointer confidence indication indicates a confidence that is greater by a given margin than is indicated by the active pointer confidence indication, and in that event to update the given tracker entry to identify the current training pointer as being a new current active pointer. At this point, the tracker circuitry may also be arranged to select another pointer from the plurality of pointers as a new current training pointer, and thereafter the above described training process can then be repeated for the new current training pointer.

In one particular example implementation, when the training pointer confidence indication indicates a greater confidence than is indicated by the active pointer confidence indication by the given margin, the tracker circuitry is further arranged to update the given tracker entry to identify the current training pointer confidence indication as being the active pointer confidence indication, to reset the training pointer confidence indication for the new current training pointer, and to reset the training counter.

There are various ways in which the new current training pointer can be selected in such a situation, but in one example implementation the aim is to cycle through the various pointers for each tracked control flow instruction in order to determine which one performs best. Hence, in one example implementation the selection of the new current training pointer is made according to a selection algorithm that seeks to allow all pointers to be used as training pointers over time. The selection algorithm can take a variety of forms, but in one example implementation may be a round robin algorithm.

As noted above, in one example implementation the training pointer confidence indication is required to indicate a confidence that is greater by a given margin than is indicated by the active pointer confidence indication, in order for the given tracker entry to be updated in the manner discussed above. This is intended to avoid too many updates to a corresponding prediction entry that may have been allocated in the prediction circuitry, so as to avoid "thrashing" of a prediction entry where the contents of that prediction entry are updated unduly often to switch back and forth between multiple associated pointers that may each provide an adequate level of prediction accuracy.

In one example implementation, the promotion circuitry is arranged, responsive to the tracker circuitry updating the given tracker entry to identify a new current active pointer, to perform an update evaluation process in order to determine whether to update the prediction circuitry.

This update evaluation process can take a variety of forms, but is intended to determine whether to allocate a prediction entry for the control flow instruction in question if it has not already been allocated a prediction entry, or in the event that a prediction entry has already been allocated, is arranged to determine whether the contents of that prediction entry should be updated. In one particular example implementation, the update evaluation process comprises determining whether the confidence indication associated with the new current active pointer indicates that the correlation threshold has been met, and when the correlation threshold is determined to have been met, determining whether a prediction entry has already been allocated for the given control flow instruction. If a prediction entry has already been allocated for the given control flow instruction, then the process will involve updating the allocated prediction entry to identify the new current active pointer for the given control flow instruction, whereas otherwise the process will involve allocating a prediction entry to identify the given control flow instruction and the new current active pointer. The process will also involve making any other necessary changes to the amended or newly allocated prediction entry, for example initialising the confidence indication in the prediction entry to a given value, and initialising or recreating the behaviour record for the prediction entry.

In one example implementation, the promotion circuitry may be arranged to invalidate the prediction entry allocated in the prediction circuitry for the given control flow instruction in the event that the active pointer confidence indication maintained in the given tracker entry of the training circuitry for the given control flow instruction drops below a given minimal threshold level. The given minimal threshold level may vary dependent on implementation, but in one example implementation indicates a zero confidence level. It should be noted that this may be done even if the confidence indication being maintained in the prediction entry of the prediction circuitry has not dropped to that low level, since it has been found that in some example implementations the confidence indication maintained by the training circuitry may be more accurate than the confidence maintained by the prediction circuitry.

In some example implementations, the apparatus may be configured so that it can operate in a variety of different power modes. In particular, in one example implementation the apparatus further comprises power control circuitry to selectively switch the apparatus between different power modes of operation in response to at least one power mode transition trigger. Each power mode transition trigger may be defined in a variety of ways, but may take into account factors such as the frequency with which a prediction is made using the prediction circuitry (in some implementations the prediction circuitry will only make a prediction when the prediction made would differ from the prediction made by a default prediction mechanism such as the earlier described TAGE prediction mechanism), the rate at which control flow instructions are being allocated into entries of the prediction circuitry, etc. Hence, by way of example, if the rate at which predictions are being made using the prediction circuitry reduces, and/or the rate at which control flow instructions are being allocated into entries of the prediction circuitry reduces, then it may be decided to enter a lower power mode of operation, whilst conversely if the rate at which predictions are being made increases, and/or the rate at which control flow instructions are being allocated increases, then it may be decided to enter a higher power mode of operation.

It has been found that such an approach can yield significant power consumption benefits. In particular, the replay prediction mechanism described herein is very specialised, and is typically used to seek to make accurate predictions for hard to predict branch instructions that cannot be accurately predicted using other prediction mechanisms provided within the system. As a result, there may be periods of time where the replay prediction mechanism is lightly used, and significant power consumption benefits can be achieved by scaling back the extent to which the replay prediction components are accessed/used.

Various different power modes could be defined. However, in one example implementation the number of pointers used could be scaled back in one or more power modes, for example where it is realised that there are a subset of the pointers that are more likely to provide good correlation. Further, in an even lower power mode the training circuitry could be turned off altogether in order to further reduce power consumption.

In one particular example implementation the different power modes of operation comprise at least two of the following power modes:

a full power mode where the training circuitry is arranged to perform the training process with reference to all of the plurality of pointers;

a reduced power mode where the training circuitry is arranged to perform the training process with reference to only a subset of the plurality of pointers; and a low power mode where the training circuitry is not used, the prediction circuitry is arranged to allocate a prediction entry for the given control flow instruction in response to a misprediction level being detected for the given control flow instruction using a default prediction mechanism, and the prediction circuitry is arranged to select a predetermined pointer as the associated pointer identified in the prediction entry.

In the example of the low power mode discussed above, the detection of a misprediction level could be triggered by a variety of events, but in one example implementation is triggered when it is determined that a reliable prediction cannot be achieved from the default prediction mechanism, such as the earlier described TAGE prediction mechanism. Further, the predetermined pointer that is used in such a low power mode may vary dependent on implementation, but in one example implementation is a pointer whose value is incremented upon occurrence of every increment event, such a pointer also being referred to herein as an IDX0 pointer. When operating in the low power mode discussed above, then when a prediction entry is allocated the associated confidence stored in that prediction entry may be initialised to indicate a zero confidence, and the behaviour record could then be populated during a subsequent training phase by the prediction circuitry, based on resolved behaviours observed for instances of the control flow instruction that has been allocated into the prediction entry.

In one example implementation, once it has been decided to transition the apparatus to a different power mode, then any other change to the power mode may be disabled for a period of time, so as to avoid a situation arising where the apparatus is frequently transitioning between two adjacent power modes.

Particular embodiments will now be described with reference to the figures.

FIG. 1 schematically illustrates an example of a data processing apparatus 2. The data processing apparatus 2 has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; a register renaming stage 11 for mapping architectural registers specified by program instructions or micro-operations to physical register specifiers identifying physical registers in a register file 14; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34.

In this example, the memory system includes a level one data cache 30, a level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The processor shown in FIG. 1 is an out-of-order processor where the pipeline 4 includes a number of features supporting out-of-order processing. This includes the issue stage 12 having an issue queue 35 for queuing instructions and issue control circuitry which is able to issue a given instruction for execution if its operands are ready, even if an earlier instruction in program order has not issued yet. Also the writeback stage 18 may include a reorder buffer (ROB) 36 which tracks the execution and the commitment of different instructions in the program order, so that a given instruction can be committed once any earlier instructions in program order have themselves be committed. Also, the register renaming stage 11 helps to support out of order processing by remapping architectural register specifiers specifying the instructions decoded by the decode stage 10 to physical register specifiers identifying physical registers 14 provided in hardware. The instruction encoding may only have space for register specifiers of a certain limited number of bits which may restrict the number of architectural registers supported to a relatively low number such as 16 or 32. This may cause register pressure, where after a certain number of instructions have been processed a later instruction which independent of an earlier instruction which references a particular register needs to reuse that register for storing different data values. In an in-order processor, that later instruction would need to wait until the earlier reference to the same register has completed before it can proceed, but these register dependencies caused by insufficient number of architectural registers can be avoided in an out-of-order processor by remapping the references to the same destination register in different instructions to different physical registers within the register file 14, which may comprise a greater number of physical registers than the number of architectural registers supported in the instruction encoding. This can allow a later instruction which writes to a particular architectural register to be executed while an earlier instruction which writes to the same architectural register is stalled, because those register references are mapped to different physical registers in the register file 14. It will be appreciated that other features may support out of order processing.

As shown in FIG. 1, the apparatus 2 has a number of prediction mechanisms for predicting instruction behaviour for instructions at particular instruction addresses. For example, these prediction mechanisms may include a branch predictor 40 and a load value or load address predictor 50. It is not essential for processors to have both forms of predictor. The load value or load address predictor is provided for predicting data values to be loaded in response to load instructions executed by the load/store unit 28 and/or predicting load addresses from which the data values are to be loaded before the operands for calculating the load addresses have been determined. For example, the load value prediction may record previously seen values loaded from a particular address, and may predict that on subsequent instances of loading from that address the value is expected to be the same. Also, the load address predictor 40 may track history information which records observed stride patterns of address accesses (where the addresses of successive loads differ by a constant offset) and then use that observed stride pattern to predict the address of a future load instructions by continuing to add offsets to the latest seen address at intervals of the detected stride.

Also, the branch predictor 40 may be provided for predicting outcomes of branch instructions, which are instructions which can cause a non-sequential change of program flow. Branches may be performed conditionally, so that they may not always be taken. The branch predictor is looked up based on addresses of instructions provided by the fetch stage 6, and provides a prediction of whether those instruction addresses are predicted to correspond to branch instructions. For any predicted branch instructions, the branch predictor provides a prediction of their branch properties such as a branch type, branch target address and branch direction (branch direction is also known as predicted branch outcome, and indicates whether the branch is predicted to be taken or not taken). The branch predictor 40 includes a branch target buffer (BTB) 43 for predicting properties of the branches other than branch direction, and a branch direction predictor (BDP) 42 for predicting the not taken/taken outcome of a branch (branch direction). It will be appreciated that the branch predictor could also include other prediction structures, such as a call-return stack for predicting return addresses for function calls, a loop direction predictor for predicting when a loop controlling instruction will terminate a loop, or other specialised types of branch prediction structures for predicting behaviour of branches in specific scenarios. The BTB 43 may have any known BTB design and will not be described in detail here. In general the BTB may act as a cache correlating particular instruction addresses with sets of one or more branch properties such as branch type or the branch target address (the address predicted to be executed next after the branch if the branch is taken), and may also provide a prediction of whether a given instruction address is expected to correspond to a branch at all.

The branch direction predictor 42 may be based on a variety of (or even multiple) different prediction techniques, e.g. a TAGE predictor and/or a perceptron predictor, which includes prediction tables which track prediction state used to determine whether, if a given instruction address is expected to correspond to a block of instructions including a branch, whether that branch is predicted to be taken or not taken. The BDP 42 may base its prediction on local history records tracked in local history storage circuitry 44. In the present techniques, one of the prediction techniques that is used is a replay predictor in which the previous execution of an instruction that is subsequently rewound can be used as a basis for predicting the outcome of its re-execution.

The apparatus 2 may have branch prediction state updating circuitry and misprediction recovery circuitry 46, which updates state information within the branch predictor 40 based on observed instruction behaviour seen at the execute stage 16 for branch instructions executed by the branch unit 24. When the branch instruction is executed and the observed behaviour for the branch matches the prediction made by the branch predictor 40 (both in terms of whether the branch is taken or not and in terms of other properties such as branch target address) then the branch prediction state updating circuitry 46 may update prediction state within the BDP 42 or the BTB 43 to reinforce the prediction that was made so as to make it more confident in that prediction when that address is seen again later. Alternatively, if there was no previous prediction state information available for a given branch then when that branch is executed at the execute stage 16, its actual outcome is used to update the prediction state information. Similarly, the local history storage 44 may be updated based on an observed branch outcome for a given branch. On the other hand, if a misprediction is identified when the actual branch outcome 24 differs from the predicted branch outcome in some respect, then the misprediction recovery portion of the state updating/misprediction recovery circuitry 46 may control updating of state within the branch predictor 40 to correct the prediction state so that it is more likely that the prediction will be correct in future. In some cases, a confidence counter-based mechanism may be used so that one incorrect prediction does not necessarily overwrite the prediction state which has previously been used to generate a series of correct predictions, but multiple mispredictions for a given instruction address will eventually cause the prediction state to be updated so that the outcome actually being seen at the execute stage 60 is predicted in future. As well as updating the state information within the branch predictor 40, on a misprediction, the misprediction recovery circuitry may also cause instructions to be flushed from the pipeline 4 which are associated with instruction addresses beyond the address for which the misprediction was identified, and cause the fetch stage 6 to start refetching instructions from the point of the misprediction.

Selecting entries of the BDP 42 based on instruction address alone may not give accurate predictions in all cases, because it is possible that the same instruction address could be reached by different paths of program flow depending on outcomes of previous instructions, and depending on the path taken to reach the current instruction, this may lead to different actual instruction behaviour for the same instruction address.

One solution to this is to select predictions based on history information which tracks a sequence of previously seen instruction behaviour. Global history can be used as the branch history format. In particular, a sequence of taken and not taken outcomes for a series of branches can be tracked. The outcome of other branch instructions can then be correlated with the current branch history over time, in order to enable future predictions to be made.

A downside to this approach is that the same global history might be seen for multiple branch instructions. For instance, the sequence NNTTTNNT (assuming a global history of 8 branch instructions is considered) might be encountered for two branch instructions at completely different addresses. In this situation, it is unlikely that there would be any correlation between the outcome of the two distant branch instructions even though the global history technically matches.

Another possibility might be to use local history, which involves correlating the outcome of a branch instruction to the global history seen at that branch instruction (i.e., the history local to that branch instruction). This solution can work well. However, it can require maintaining a large amount of data for each branch instruction. For instance, since each branch instruction might be encountered with different frequencies and along different paths, it may be necessary to track the history multiple times—once for each branch instruction. A further difficulty with using local history is that in many cases, the local history might not be relevant. For instance, consider the situation illustrated in FIG. 2. Here, branch A acts as a guard for branch B. In other words, branch B is only encountered dependent on the outcome of branch A. The outcome of branch A forms part of the local history of branch B. However, this information is irrelevant because the entry in the local history for branch A will always be the same value.

Separately to this, it is also desirable to enable replay prediction. In a speculative out-of-order processor, instructions can be executed in an order other than how they appear in the program itself in order to improve overall efficiency of execution. In such situations, some later branch instructions might resolve while the result of an earlier branch instruction is waiting for resolution. For instance, in the example of FIG. 3, the short latency hard to predict condition might be expected to resolve before the long latency hard to predict condition is resolved. Under normal circumstances, if the long latency instruction was mispredicted then a 'rewind' occurs that causes the program to revert to the state that it was in at the time the long latency instruction was executed. This is done in order to prevent the wrong execution path being taken. However, as a consequence of this, the prediction and outcome data generated for the short latency instruction is lost. In practice, however, since execution of the short latency instruction is not dependent on the long latency instruction, the previous execution of that instruction is likely to be a very good guide as to how the instruction will execute when it is reexecuted. Hence, it would be beneficial for the result of executing the short latency instruction to be kept (despite the rewind) in order to be available for a future 'replay prediction'. Note, however, that history-based predictors may not be able to help with such replays. This is because the history taken to get to the short latency instruction will be different between the two executions due to the misprediction. In particular, the long latency instruction is taken in one execution and not taken in the other. With differing history information, it is difficult if not impossible to form a prediction of the short latency instruction.

In accordance with the techniques described herein, a mechanism is used that makes it possible to index previous behaviours of a branch instruction according to indexes of FOR loops within the program. Each instance of a given instruction can therefore be individually recognised (a branch instruction that occurs outside a FOR loop simply has an index of 0). If the same iteration/index is encountered again in the future (e.g. due to a replay that occurs after a rewind due to a misprediction event) then the previous behaviour of that branch instruction for that iteration/index can be used as the prediction for the direction in which the branch instruction will go.

An example of this is illustrated in FIGS. 4A and 4B. FIG. 4A shows an example in which a FOR loop contains a long latency branch instruction and a short latency branch instruction. In this example, it is assumed that a misprediction occurs with the second iteration (i=1) of the long latency instruction. That is to say that a prediction is made for one direction and on resolution it is determined that the prediction was incorrect. However, because the long latency instruction is followed by a short latency instruction and because these can be performed out of order, the situation arises in which several further executions of later iterations of the short latency instruction are made before the second iteration of the long latency instruction is resolved thereby revealing the misprediction and resulting in a rewind. In these situations, it would be desirable to store the results of those executions to form the basis of future predictions.

FIG. 4B shows the storage of the data. As described earlier, the indexing is carried out based on the index of the FOR loop. Due to the difference in latencies, more (4) executions of the short latency instruction are made as compared to the long latency instruction (2). When the rewind occurs, the program returns to the second iteration (i=1) of the loop and the long latency instruction is taken (rather than not taken, which was the incorrect prediction). However, the executions performed for the third and fourth iterations (i=3 and i=4) of the short latency instruction remain stored. Then, when the third and fourth iterations are reached for the second time, the previous executions of those iterations can form the basis of predictions for the short latency branch instruction.

A difficulty with this approach is aligning the indexing of the branch behaviour with the index of the FOR loop. In particular, at the time of instruction execution there may be nothing to distinguish a FOR loop from any other branch instruction. Even then, it may not be immediately obvious how to determine which variable (e.g., which value in which register) is used as the index for the FOR loop. One approach to solving this problem is to count backwards taken branches (i.e., instructions where the value of the program counter has decreased as compared to its previous value) and to use this as the index. A loop such as a FOR loop will contain a backwards taken branch at the end of the main body. By keeping a running count of such branches through execution of the program, it is possible to unique identify each instance of each instruction.

However, even this approach is not without difficulty. In particular, such a pointer can become polluted. For example, consider the situation shown in FIG. 5. Here, an outer FOR loop is present, which contains an inner FOR loop, whose index is hard to predict. Indeed, the iteration count might always be different (or could even be random). By the time branch A is reached, the backwards taken branch pointer could point to a variety of locations. Consequently, the index at which the behaviour of branch A is stored may have no relation to the index of the outer FOR loop. This therefore makes any replay impractical since it is very difficult to determine the previous behavioural execution of branch A for a given iteration of the outer FOR loop.

In accordance with the techniques described herein, this problem is alleviated by providing a plurality of pointers. Not every pointer is updated at every backwards taken branch instruction. In some cases, some pointers could be updated with every backwards taken branch instruction. Other pointers could be updated only every M backwards taken branch instructions. Some backwards taken branch instructions might update multiple (or even all) pointers. By maintaining a number of pointers, each of which is updated differently, it is expected that one of the pointers will be incremented in correspondence with the FOR loop index.

Figure 6:
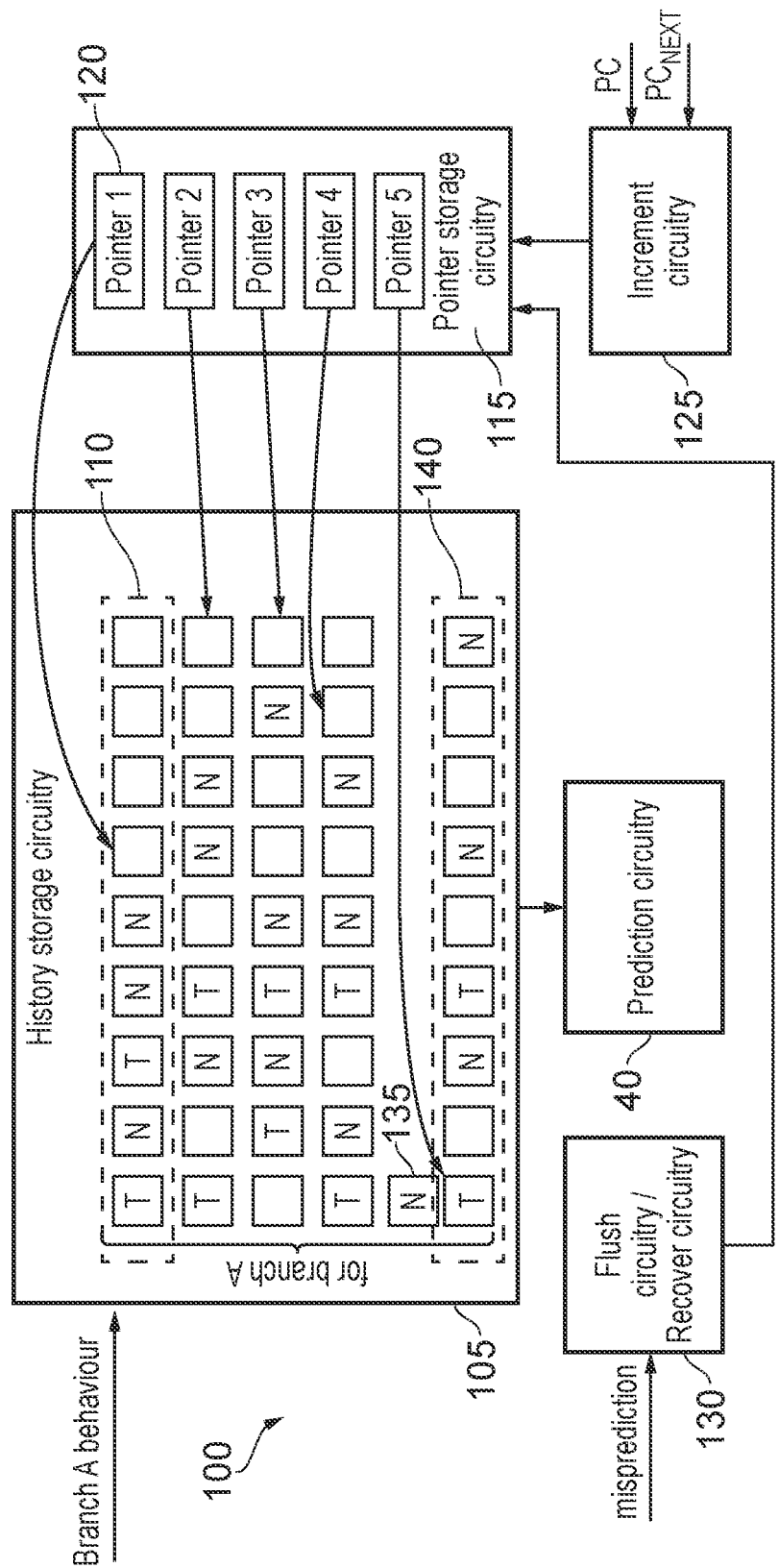
FIG. 6 schematically illustrates an example of a data processing apparatus.

FIG. 6 illustrates an example of a data processing apparatus 100 in accordance with some examples. The data processing apparatus 100 includes history storage circuitry 105. This stores six sets 110 of behaviours of instances of a control flow instruction that are usable to predict the behaviour of that control flow instruction (branch A) during a replay situation. It will be appreciated that multiple pluralities of sets may be provided—each for a different control flow instruction. Pointer storage circuitry 115 is provided that stores a plurality of pointers 120, with each of the pointers 120 being associated with one of the sets 110 of behaviours. The pointer is used to index entries into the sets. That is, each pointer indicates where a next entry into the associated set should be stored. In this example, the actual behaviours are the same, but the set of behaviours differs due to the indexing. In this example, the behaviours are (in order) TNTNN. However, the sets differ because in some instances, there are gaps between some of the behaviours. The differences in the behaviours arise due to differences in how the pointers 120 in the pointer storage circuitry 115 are updated by the increment circuitry 125. In particular, the increment circuitry receives a current program counter value (PC) and the program counter value of a next instruction ($PC_{NEXT}$). If $PC_{NEXT}$ is less than or equal to PC, then the current instruction is a backwards taken branch and one or more of the pointers are updated.

Two special sets 135, 140 may be stored for each control flow instruction. The first of these sets 135 tracks only the most recent prediction that has been made for the control flow instruction. The second set 140 has its pointer incremented for all backwards taken control flow instructions.

Prediction circuitry 40 is provided to make a prediction of the future behaviour of the control flow instruction (e.g. branch A) based on one of the sets. It is hoped that the set that would be selected is one that corresponds with the FOR loop. A training process can be performed to determine which set of behaviours to use. With one of the set having been selected, the corresponding pointer is used to index into that set. If a previous behaviour is stored then this can be used to form the basis of the prediction for the control flow instruction. Otherwise, more common prediction techniques can be used. That is, if one set 110 has been selected and if the corresponding pointer 120 currently refers to index '3' then it is determined whether the set 110 has an entry at index 3. If so, then a previous execution of the branch A at this iteration has occurred and the behaviour (T) can be used to predict how branch A will perform again (e.g. it will be taken). If the entry is empty then no previous behaviour has been recorded for the current iteration and so no prediction is made in this way. Other prediction techniques can be used instead.

Finally in FIG. 6, flush circuitry and recover circuitry 130 (which are shown as a single device) are provided. In response to a misprediction on a control flow instruction, this causes a flush of the pipeline to occur. As part of this process, the values of the pointers 120 are reset to a value that they had at the time of the mispredicted instruction being issued. However, the contents of the history storage circuitry 105 are not touched as a consequence of the flush. That is the flush itself does not count as a backwards taken branch instruction and the behaviours of the instructions that follow the mispredicted instruction are not erased from the history storage circuitry 105 and thus can be used to form the basis of a later prediction.

Figure 7:
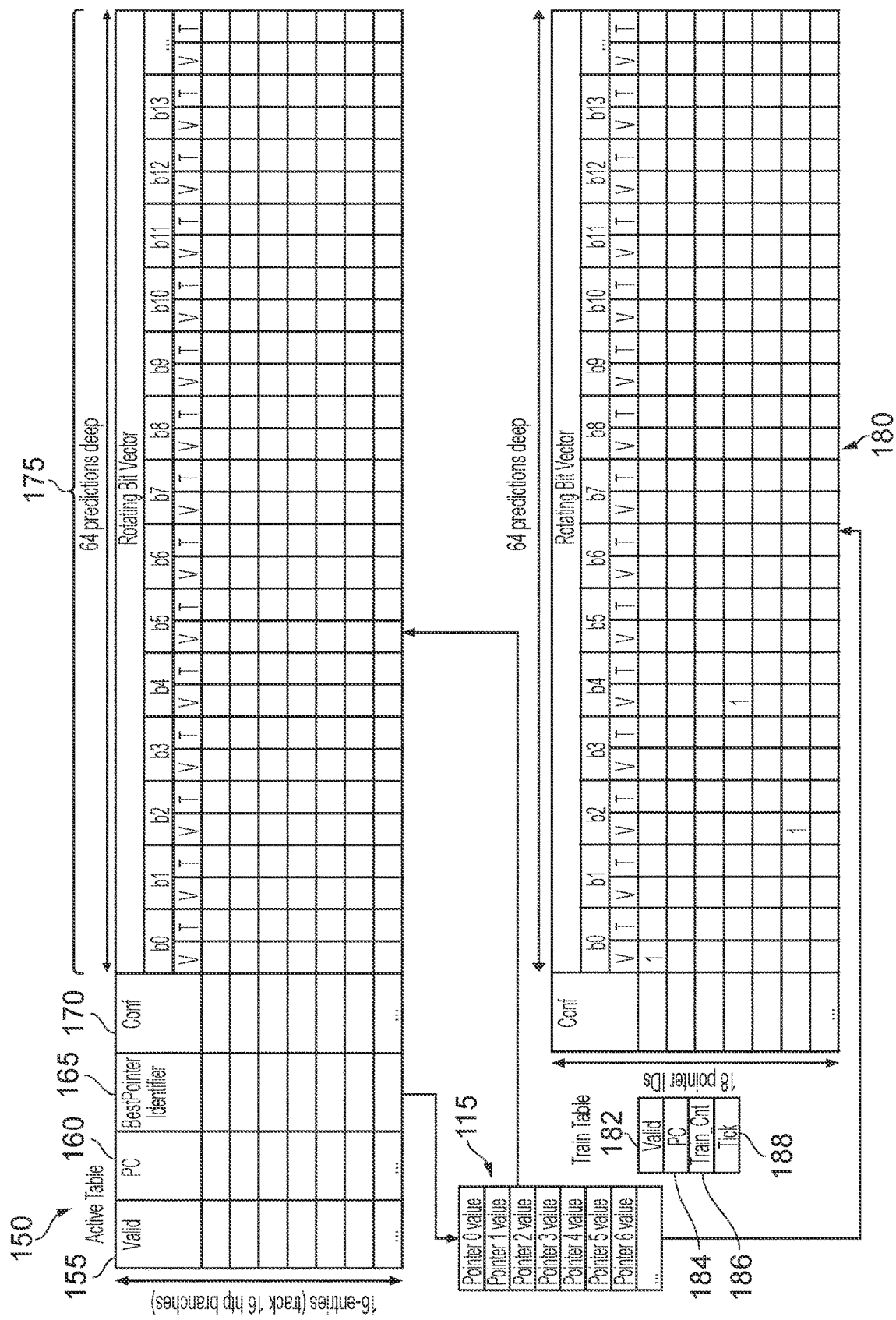
FIG. 7 schematically illustrates how training could be performed to determine pointers to associate with hard to predict (HTP) branch instructions being tracked.

One mechanism that could be used to seek to perform training within the apparatus of FIG. 6, in order to decide which pointer to use for any given control flow instruction being tracked within the history storage 105, is schematically illustrated in FIG. 7. In this example, a separate active table 150 and train table 180 is provided. The active table 150 includes a plurality of entries, where each entry is used for one HTP branch for which it is desired to make predictions. Each entry includes a valid field 155 to identify whether the entry is valid, a program counter field 160 to identify an address of the HTP branch instruction being tracked in that entry, a best pointer identifier field 165 to identify the pointer that is considered to be the best pointer for the HTP branch instruction being tracked, and a confidence indication 170 used to determine when there is sufficient confidence in the contents of the entry to enable predictions to be made using that entry. A rotating bit vector 175 is then maintained in each entry, in which to maintain the set of behaviours discussed earlier with reference to FIG. 6, populated using the pointer identified by the best pointer identifier field 165. As shown in FIG. 7, each entry in the bit vector is used to identify a taken or not taken prediction, and has a valid bit to identify whether a valid taken or not taken prediction has been stored in that entry.

The train table 180 enables, at any point in time, training to be performed for one hard to predict branch instruction being tracked in the active table. The valid field 182 is used to indicate when the contents of the train table are valid, the PC field 184 is used to identify the address of the HTP branch instruction being trained, and the train count field 186 is used to keep track of the number of training events that have taken place when training that HTP branch instruction. Separate entries in the train table are provided in order to maintain a rotating bit vector for each of the possible pointers stored in the pointer storage circuitry 115. In this particular example, it is assumed that there are 18 pointers, and hence 18 entries are provided. The rotating bit vectors take the same form as discussed earlier for the rotating bit vector 175 within the active table.

Whenever a resolved behaviour of the branch instruction for which training is being performed is received, an update process is performed for each of the entries of the train table 180 using, for each entry, the current value of the associated pointer, and if a bit vector entry pointed to by the pointer value is valid, and has a taken/not taken prediction that matches the resolved behaviour, then the confidence of that entry can be increased. Similarly, if the taken/not taken prediction does not match the resolved behaviour, then the confidence can be decreased. If there is not yet a valid bit vector entry, then that bit vector entry can be populated using the resolved behaviour. A similar update process can be performed within the active table 155 for each resolved behaviour received, and when the confidence indication indicated by the confidence indication field 170 reaches a threshold level, predictions can start to be made using the contents of the bit vector 175 for the entry containing the hard to predict branch in question.

Once a certain number of confidence updates (as indicated by the train count 186) have been made to an entry in the train table 180 for any of the pointers, then it can be determined whether the pointer having the highest confidence in the train table exceeds the confidence 170 of the current best pointer identified in the field 165 of the active table, and if so the best pointer identifier 165 and confidence indication 170 can be updated to identify the trained pointer having the highest confidence. At this point, the associated rotating bit vector 175 can also be updated to reflect the contents of the corresponding entry in the train table.

In the example illustrated in FIG. 7, a tick field 188 is provided, which can be used as a timeout in case a period of time elapses without any further training event been detected, so as to cause the current contents of the train table to be evaluated, the relevant entry in the active table to be updated if necessary, and then training to be performed for a different one of the hard to predict branch instructions being tracked in the active table.

Whilst this process can enable training to be performed for each of the hard to predict branch instructions being tracked, it suffers from a number of issues. Firstly, training can only be performed for one hard to predict branch at a time, and as a result the time taken to identify the best pointers to use for the various branch instructions being tracked can be unacceptably high. Also there are large periods of time where any given one of the branch instructions being tracked is not being trained, and hence the training may not be as accurate as desired. These problems are exacerbated if it is desired to increase the number of branch instructions being tracked.

Furthermore, in addition to the above disadvantages, if the size of the active table is increased to seek to track more hard to predict branches, then this leads to significant size/area requirements, due to the need for dedicated storage to store each of the rotating bit vectors for each of the entries.

Figure 8:
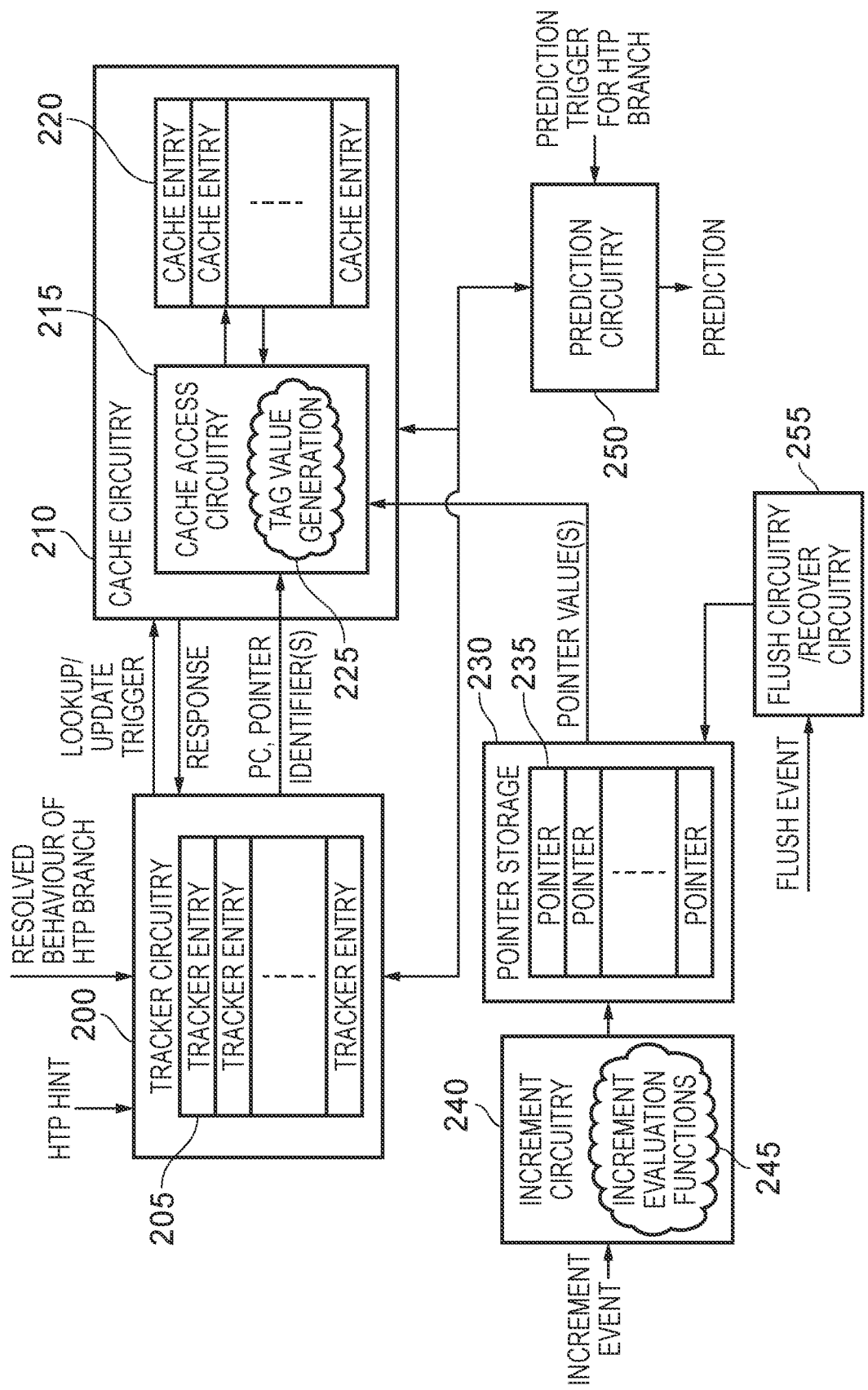
FIG. 8 schematically illustrates an example of a data processing apparatus in accordance with one example implementation.

In accordance with the techniques described herein, a mechanism is provided that seeks to alleviate the above issues, allowing a larger number of hard to predict branch instructions to be tracked in a cost/area efficient manner, and which improves the manner in which training is performed for the various hard to predict branches being tracked. An example of an apparatus in accordance with one example implementation is illustrated schematically in FIG. 8. As shown in FIG. 8, tracker circuitry 200 is provided that maintains a number of tracker entries 205. Each tracker entry can be used to identify an HTP branch instruction, a current active pointer to be associated with that instruction, and a current training pointer to be associated with that instruction. Confidence indications can also be maintained in the tracker entry for each of the active pointer and the training pointer. There are various ways in which it can be decided when to allocate any given branch instruction to an entry of the tracker circuitry 200, but in one example implementation a hard to predict hint may be provided to the tracker circuitry, for example to identify a branch instruction for which reliable prediction is not being achieved using a default prediction mechanism, for example the earlier discussed TAGE predictor.

Pointer storage 230 is provided that maintains a plurality of pointers 235, in much the same way as the earlier described pointer storage circuitry 115. However, instead of seeking to maintain bit vectors of resolved behaviours within the various tracker entries, cache circuitry 210 is provided that has a plurality of cache entries 220, where each cache entry is arranged to store a resolved behaviour of an instance of an HTP branch instruction being tracked by any of the tracker entries along with an associated tag value generated when the resolved behaviour was allocated into that cache entry. Cache access circuitry 215 is provided for maintaining the contents of the various cache entries 220, and for performing lookup operations within those cache entries as and when required. The cache access circuitry 215 includes tag value generation circuitry 225 that generates the associated tag values to be stored in association with resolved behaviours when those resolved behaviours are allocated into cache entries, and also to produce comparison tag values used when performing lookup operations.

Whenever a lookup operation needs to be performed (as for example may be the case when a resolved behaviour of an HTP branch instruction being tracked by the tracker circuitry 200 is observed, this resulting in the issuance of a lookup/update trigger to the cache circuitry 210 from the tracker circuitry 200), the cache access circuitry 215 will receive an identifier of the HTP branch instruction for which a lookup operation is required, in one example this being achieved by providing the program counter value of that HTP branch instruction from the tracker circuitry 200 to the cache access circuitry 215, and will also receive an identifier of the relevant pointer to be used when performing the lookup operation. This may be either the active pointer or the training pointer identified in the corresponding tracker entry, depending on the lookup required, and indeed in one example implementation it will typically be the case that two lookup operations will be performed, one using the active pointer and one using the training pointer. The tag value generation circuitry can then combine the received information, in combination with the pointer value of the relevant pointer as obtained from the pointer storage 230, in order to generate a tag value to be used during the lookup operation, as will be discussed in more detail later.

Depending on the outcome of such lookup operations, the contents of the various tracker entries may be updated, for instance to increment or decrement pointer confidence indications maintained for the active pointer and/or the training pointer. In addition, a training counter value may be maintained within each tracker entry, which can be incremented when a training event is determined to have occurred, in one example such a training event being determined to have occurred when either one or both of the active pointer confidence and the training pointer confidence for a given entry are updated. As will be discussed in more detail, when the training count has reached a threshold level, it can be determined whether the current training pointer is performing better than the current active pointer, and if so that training pointer can be identified as the new active pointer. Also at that point, a new training pointer can be chosen for the entry, and the training process reinitiated for that new training pointer.

By using a shared cache storage to maintain the resolved behaviours in, which is accessed in the way discussed above, this can significantly reduce the storage requirements for each individual HTP branch to be tracked, and hence can allow a significantly larger number of HTP branches to be tracked for any given area/cost provided for implementing such replay prediction. In one particular example implementation, the tracker circuitry may be arranged to maintain 256 tracker entries.

Increment circuitry 240 is provided that is responsive to increment events to apply a series of increment evaluation functions 245 to decide which pointers to increment in response to any given increment event. In one example implementation, the increment events take the form of detected backwards taken branches, such that each time a backwards taken branch is detected the increment circuitry 240 is arranged to perform the increment evaluation functions 245 in order to decide which pointers within the pointer storage 230 to increment. As discussed earlier, the evaluation functions can take a variety of different forms, but the aim is that over time the various pointers are incremented differentially with respect to each other. By way of specific example, and as noted earlier, a first pointer could have its value incremented for every backwards taken branch irrespective of the program counter value, a second pointer could be arranged never to be incremented irrespective of the program counter value, a third pointer could be incremented if a hash of all of the program counter bits is 1, a fourth pointer could be incremented if the hash of all the program counter bits is 0, etc.

When considering the above specific examples of pointers, it should be noted that the approach described in FIG. 8 where a shared cache structure is used, in addition to all the other benefits described herein, also provides a further efficiency benefit when compared with the approach shown in FIG. 7. In particular, the second pointer (i.e. the one that is never incremented irrespective of the program counter value) essentially corresponds to a last prediction direction tracker. However, the replay predictor would perform better if it used this pointer only when reusing the prediction for the same instance of a hard to predict branch from the wrong path to the new path, and not for subsequent instances of that hard to predict branch. Using the rotating buffer approach of FIG. 7, the last prediction is never cleared, so subsequent instances of that branch may use that prediction. However, when that prediction is allocated into the cache structure in the manner described herein, it will be evicted from that cache by predictions made by other branches and pointers. This ages out the prediction based on the second pointer, preventing it from being used on subsequent instances of the hard to predict branch.

Returning to FIG. 8, prediction circuitry 250 is provided that, in response to a prediction trigger in respect of a HTP branch instruction being tracked by the tracker circuitry 200, is arranged to reference the contents of the tracker circuitry 200 and the cache circuitry 210 in order to determine whether a prediction can be made of the behaviour (in this case the behaviour being whether the branch is predicted as taken or not taken) for the HTP branch instruction in question. In particular, if a lookup performed within the cache circuitry 210 using the program counter value of the HTP branch instruction, the currently active pointer and the value of that currently active pointer, results in a hit been detected, and the confidence in the currently active pointer has reached at least a threshold level, then the prediction circuitry may make a prediction using the behaviour stored in the hit entry of the cache.

As also shown in FIG. 8, flush circuitry/recover circuitry 255 can be provided to operate in much the same way as the circuitry 130 shown in FIG. 6, in response to a flush event. In one example implementation, such a flush event will occur when a misprediction is detected that causes the contents of the pipeline to be flushed and processing to resume from a previous position in the execution flow. As noted previously, the flush circuitry can be arranged to maintain the contents of the tracker circuitry and the cache circuitry during such a flush operation, and the recover circuitry can recover the relevant previous pointer values for the various pointers in response to the flush.

Figure 9:
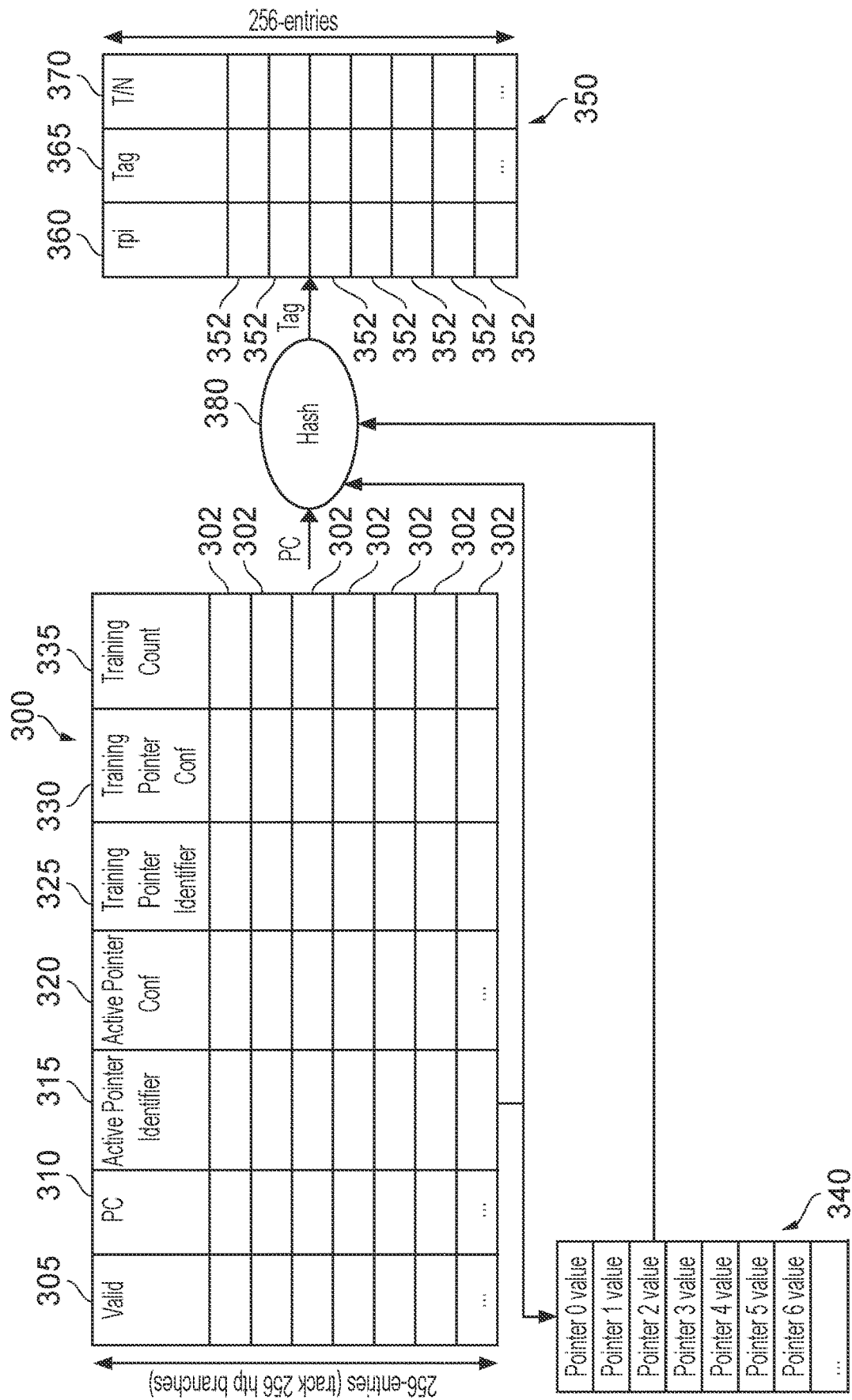
FIG. 9 illustrates how tag values may be generated in accordance with one example implementation when seeking to access the cache illustrated in FIG. 8.

FIG. 9 illustrates in more detail the contents of the tracker entries and cache entries, and the way in which tag values are generated, in accordance with one example implementation. In this example, the tracker circuitry contains tracker storage 300 providing a plurality of tracker entries 302. As shown, each tracker entry has a plurality of fields. A valid field 305 is used to identify whether the contents of the corresponding entry are valid, whilst the program counter field 310 is used to store the program counter value of the HTP branch instruction being tracked in that entry. An active pointer identifier 315 identifies one of the plurality of pointers in the pointer storage that is currently viewed to be the active pointer for the entry in question, and the associated active pointer confidence field 320 identifies a confidence indication for that active pointer. Similarly, the field 325 identifies a training pointer, again this being chosen from amongst the pointers maintained in the pointer storage 230, whilst the associated training pointer confidence field 330 provides a confidence indication for the training pointer. The training count field 335 is used to maintain a count of training events that have occurred in respect of the corresponding entry, so that when a certain threshold is reached an evaluation can be performed to determine whether the training pointer is performing better than the active pointer.

As shown in FIG. 9, the cache circuitry 210 may maintain a cache storage 350 containing a plurality of cache entries 352. Each cache entry can be used to store a tag value 365 generated by the tag value generation circuitry 225 when that cache entry was populated, and can also store an associated resolved behaviour in the field 370, in this case the taken/not taken behaviour. As also shown in FIG. 9, if desired, a field 360 can be used to store replacement policy information (rpi) referenced by the cache circuitry when selecting a victim cache entry whose current contents are to be overwritten to make space for allocation of new content.

The tag value generation circuitry 225 can take a variety of forms, but in the example of FIG. 9 implements a hash function 380 using as inputs the program counter value of the HTP branch instruction in question, the active pointer identifier associated with that HTP branch instruction in the relevant tracker entry, and the current pointer value of that active pointer as obtained from the pointer storage 340 (this corresponding to the pointer storage 230 shown in FIG. 8). By performing a hash operation using these three pieces of information, it will be appreciated that the tag value generated will be dependent on the current active pointer, and the value of that active pointer at the time the tag value is generated.

The cache storage 350 can be organised in a variety of ways, and hence for example could take the form of a fully associative cache or a set associative cache. In one particular example implementation it is assumed that the cache storage is a fully associative cache, and accordingly all entries are referenced when performing a lookup operation, as any given content can be allocated in any available entry within the cache.

Figure 10:
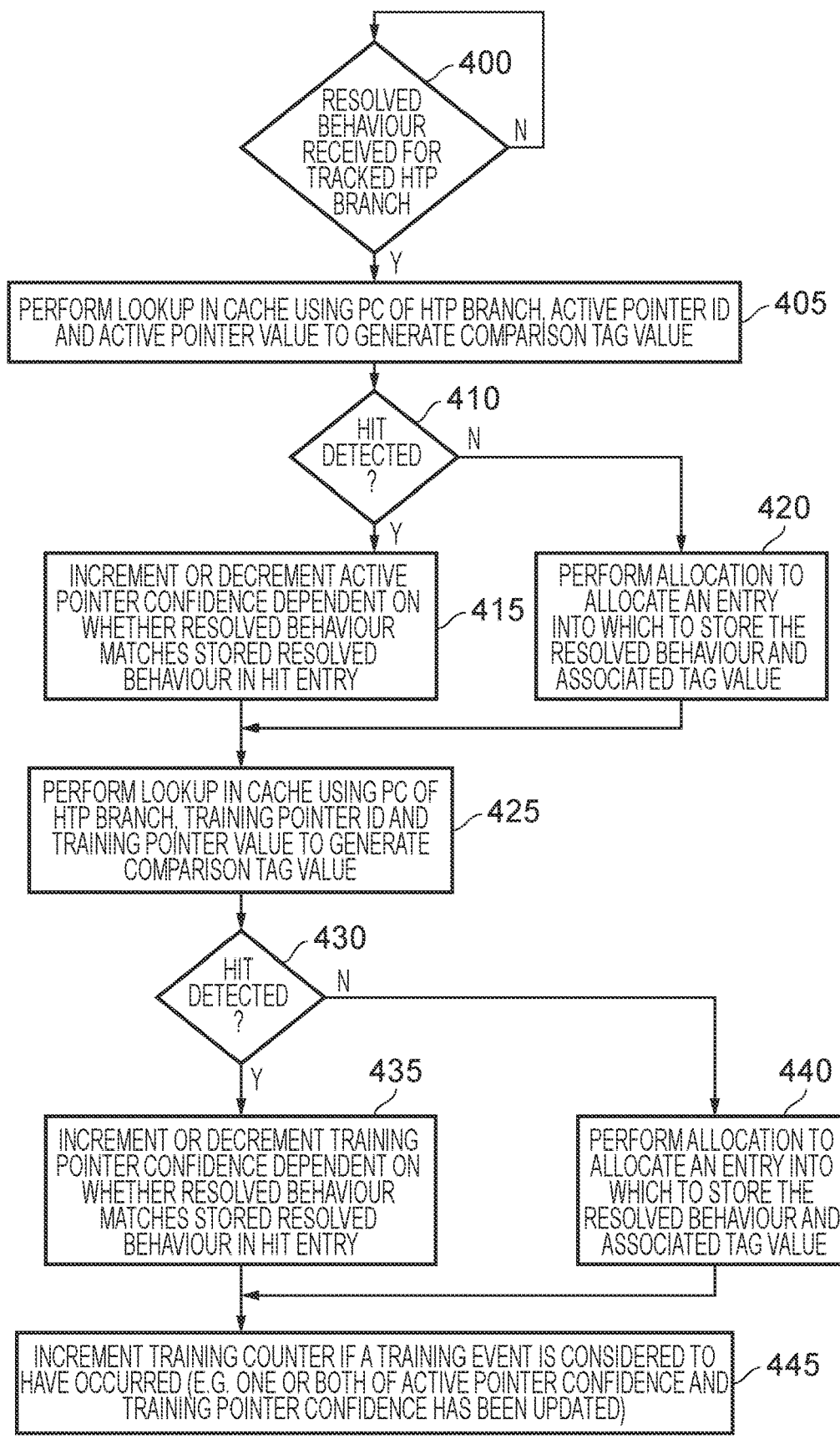
FIG. 10 is a flow diagram illustrating steps performed by the apparatus of FIG. 8 upon receiving an indication of resolved behaviour for a tracked HTP branch instruction, in accordance with one example implementation.

FIG. 10 is a flow diagram illustrating steps performed by the apparatus of FIG. 8 when a resolved behaviour is received for an HTP branch instruction being tracked within the tracker circuitry 200. When such a resolved behaviour is detected at step 400, then at step 405 a lookup is performed in the cache of the cache circuitry 210 using a comparison tag value that is generated using the program counter value of the HTP branch instruction in question, the active pointer identifier for that HTP branch as identified by the tracker entry, and the pointer value of that active pointer.

It is then determined at step 410 whether a hit has been detected in one of the cache entries (i.e. whether the comparison tag value matches the stored tag value in that entry), and if so the process proceeds to step 415 where the active pointer confidence in the relevant tracker entry may be incremented or decremented dependent on whether the resolved behaviour matches the stored resolved behaviour in the hit entry. For example, in one particular implementation the active pointer confidence is incremented if the resolved behaviour matches the stored resolved behaviour, and is otherwise decremented. However, if desired, this increment/decrement functionality can be made dependent on other criteria. For example, it may be determined in one example implementation to inhibit update of the confidence indication if the predicted behaviour stored in the hit entry matches the prediction that would have been made using a default prediction mechanism, such as the earlier described TAGE predictor.

If a hit is not detected at step 410, then in one example implementation an allocation is performed within the cache, in order to allocate an entry into which to store the resolved behaviour and the associated tag value. The earlier discussed replacement policy information can be referenced by the cache circuitry when determining a victim entry into which to allocate this new information. In one example implementation, when performing such an allocation, no update is made to the active confidence indication being maintained in the relevant tracker entry.

As also shown in FIG. 10, in addition to performing a lookup using the active pointer, a lookup is also performed using the training pointer. Hence, at step 425, a comparison tag value is generated using the program counter of the HTP branch instruction, the training pointer identifier stored in the relevant tracker entry, and the current pointer value of that training pointer, and a lookup is performed in the cache using that comparison tag value. At step 430 it is determined whether a hit has been detected, and if so then at step 435 the training pointer confidence may be incremented or decremented dependent on whether the resolved behaviour matches the stored resolved behaviour in the hit entry, in much the same way as the active pointer confidence is incremented or decremented as discussed earlier with reference to step 415.

Again, this functionality can be inhibited in certain situations if desired, for example if the predicted behaviour stored in the hit entry matches the prediction that would be made by a default prediction mechanism. Further, in one example implementation, if only one of the two lookup operations performed at steps 405 and 425 results in the associated confidence indication needing to be incremented, and that associated confidence indication is already at a saturated level, then instead the other confidence indication can be decremented (so by way of specific example, if it was determined that the active pointer confidence needed incrementing but the training pointer confidence did not, and the active pointer confidence was already at a saturated level, it may be determined instead to decrement the training pointer confidence).

If a miss is detected at step 430, then at step 440 an entry can be allocated into which to store the resolved behaviour and the associated tag value, in much the same way as an allocation may be performed as discussed earlier at step 420 when performing the lookup using the active pointer.

Irrespective of which of steps 435 or 440 are performed, at step 445 the training counter is incremented if a training event is considered to have occurred. In one example implementation, such a training event will be considered to have occurred if one or both of the active pointer confidence and the training pointer confidence has been updated as a result of the process described with reference to FIG. 10.

Figure 11:
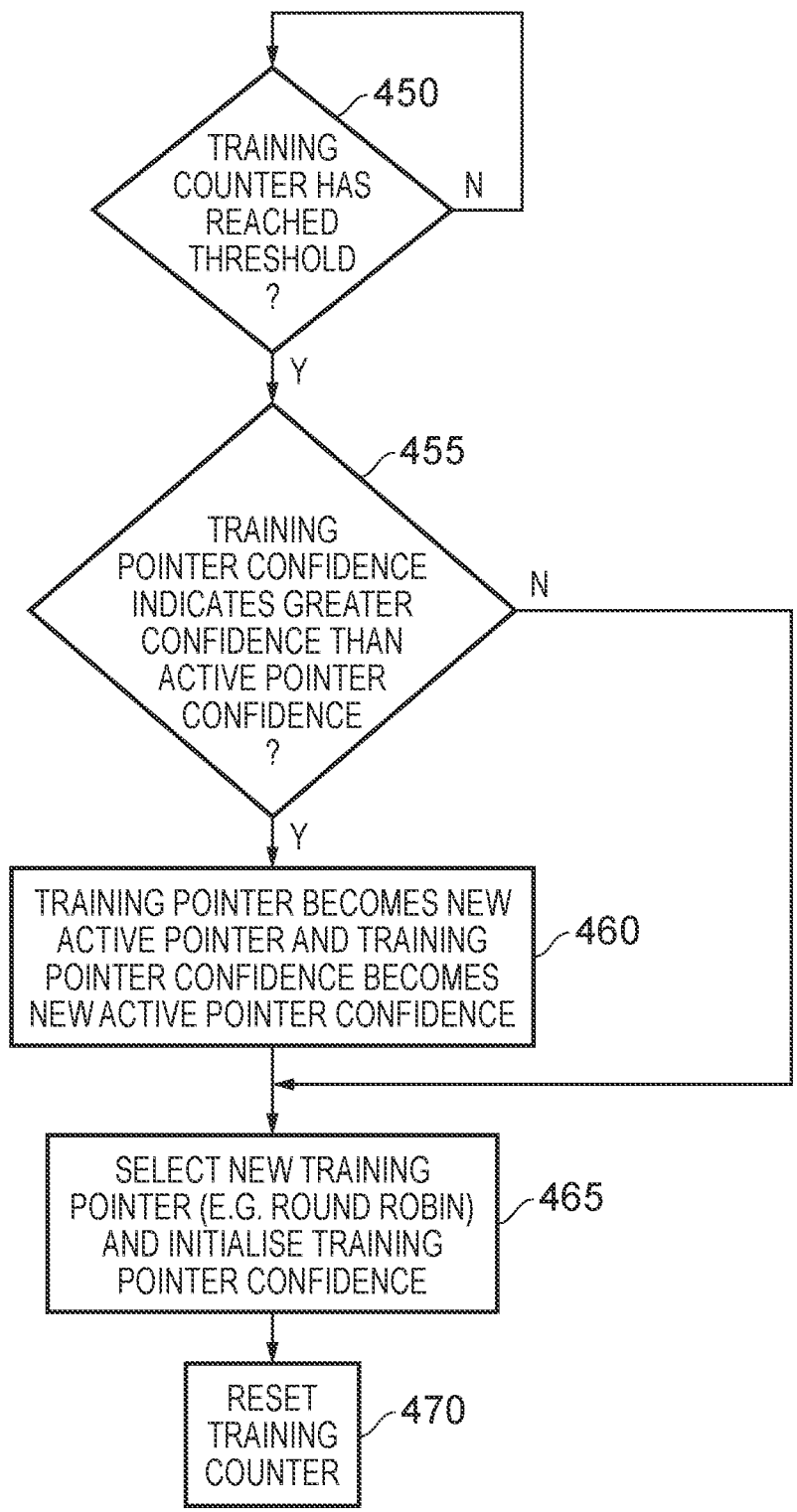
FIG. 11 is a flow diagram illustrating steps performed by the apparatus of FIG. 8 upon determining that a training counter has reached a determined threshold, in accordance with one example implementation.

FIG. 11 is a flow diagram illustrating steps taken in one example implementation when the training counter of a given tracker entry has reached a threshold level. Any suitable threshold level can be chosen, but in one particular example implementation the threshold level is determined to have been reached when 32 training events have been detected. When this is detected at step 450, it is then determined at step 455 whether the training pointer confidence indicates a greater confidence than the active pointer confidence, for the tracker entry in question. If so, then the training pointer becomes the new active pointer at step 460, and similarly the training pointer confidence becomes the new active pointer confidence. Thereafter, at step 465, or directly following step 455 if it is determined that the training pointer confidence is not greater than the active pointer confidence, a new training pointer is selected and the training pointer confidence is initialised for that newly selected training pointer. There are various ways in which the new training pointer can be selected, but the aim is to cycle through all of the possible pointers over time in order to decide which one performs best for any given HTP branch instruction being tracked, and hence in one example implementation the new training pointer can be selected in a round robin manner, by cycling through the pointers maintained within the pointer storage 340. At step 470, the training counter is then reset, so as to reinitiate the above described training process.

It should be noted that by adopting the above described approach, each of the tracker entries is trained at its own rate, depending on the frequency at which the HTP branch instruction being tracked in that tracker entry is encountered, and hence allows training to be performed more quickly for the more commonly appearing HTP branch instructions. This can significantly improve performance, since the more frequently appearing HTP branch instructions are the ones that will give rise to the best incremental performance improvement if they are predicted correctly.

Figure 12:
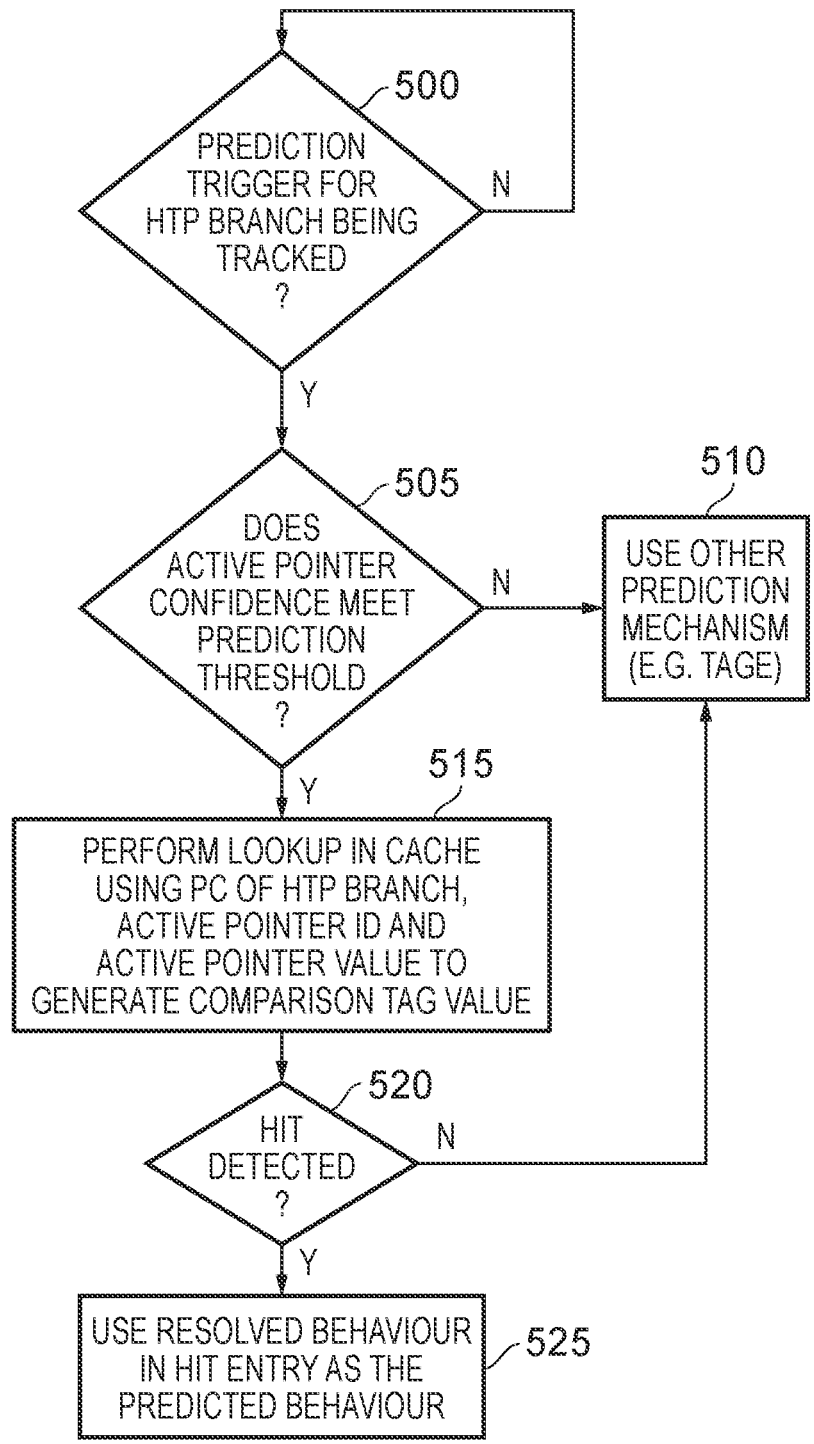
FIG. 12 is a flow diagram illustrating steps performed by the apparatus of FIG. 8 upon receipt of a prediction trigger for a tracked HTP branch instruction, in accordance with one example implementation.

FIG. 12 is a flow diagram illustrating steps taken by the apparatus of FIG. 8 upon receipt of a prediction trigger for a HTP branch instruction being tracked within the tracker circuitry. When such a prediction trigger is received (for example due to a tracked HTP branch instruction being detected in the instruction flow), it is determined at step 505 whether the active pointer confidence indicated in the relevant tracker entry meets a determined prediction threshold, and if not then at step 510 a different prediction mechanism is used to make the prediction, for example the earlier discussed TAGE predictor.

However, if the active pointer confidence does meet a specified prediction threshold, then at step 515 a lookup is performed in the cache using a comparison tag value generated using the program counter of the HTP branch instruction in question, the active pointer identifier as identified by the relevant tracker entry, and the current value of the active pointer. It is then determined at step 520 whether a hit has been detected, and if not then the process proceeds to step 510 where another prediction mechanism is used as discussed earlier. However, if a hit is detected, then the resolved behaviour as stored in the hit entry is used as the predicted behaviour at step 525.

It has been found that the above described techniques can provide for significantly improved prediction performance for a variety of HTP branch instructions than would be achieved by using other prediction mechanisms. However, it may still be the case that there are certain HTP branch instructions for which it is difficult to obtain accurate predictions. For example, some HTP branch instructions may be provided within a software function that is called from multiple different places within program code, and the behaviour of that HTP branch instruction may depend upon where that function is called from within the program code. As a result, the correlation that is seeking to be determined using the above described technique may be difficult to realise due to the behaviour of that HTP branch instruction varying in such a way.

Figure 13:
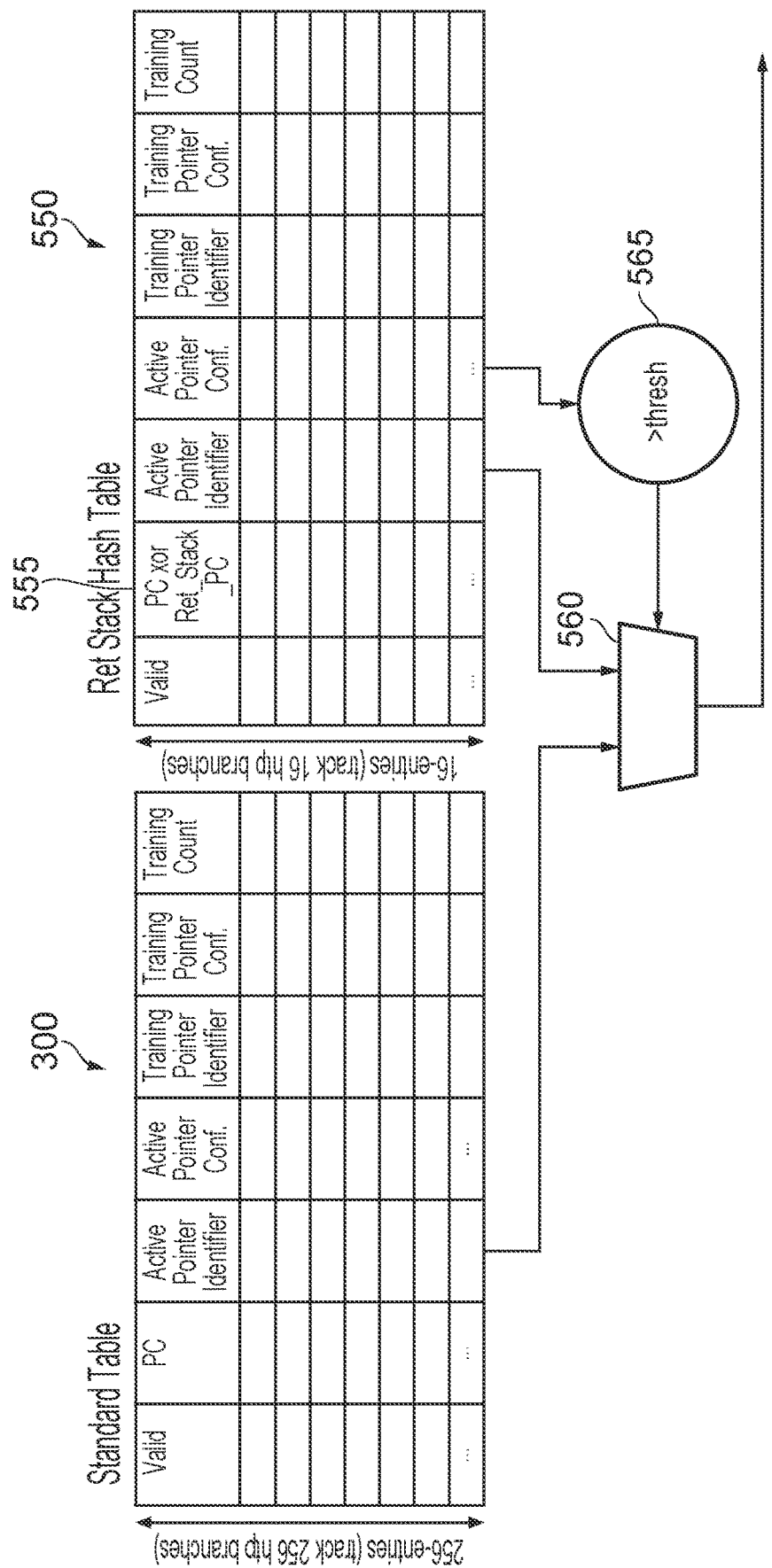
FIG. 13 is a diagram schematically illustrating the use of an additional tracker table for hard to predict branch instructions, in accordance with one example implementation.

In order to seek to improve the prediction accuracy for such HTP branch instructions, then in one example implementation the tracker circuitry may be arranged to maintain a plurality of additional tracker entries, as illustrated schematically in FIG. 13. As shown, in addition to the standard tracker table 300, which may take the form discussed earlier with reference to FIG. 9, an additional table 550 may be provided, referred to in FIG. 13 as a return stack hash table. As will be seen, the return stack hash table 550 contains a number of entries that essentially have the same fields as the entries in the standard table. However, instead of merely storing the program counter of the HTP branch instruction being tracked, as can be seen by the field 555 of an entry in the return stack hash table 550, that program counter value is XORed with a return stack program counter value identifying where within the program code execution will return to once the function containing the HTP branch instruction in question has completed. Hence, the address indication captured within the field 555 is influenced by where within the program code the function containing the HTP branch instruction in question was called from.

The entries in the return stack hash table 550 can be used and trained in much the same way as the entries in the standard table 300, with both of these tracker tables making use of the cache storage maintained by the cache circuitry 210. The only difference is that when the tag value generation circuitry performs the tag generation process, it will use the contents of the field 555 as the address indication, and as noted above those contents are formed by combining the program counter of the HTP branch instruction in question with a return stack program counter value.

How many entries are provided within the return stack hash table 550 is a matter of design choice, but in one example implementation it may be the case that there are significantly fewer entries in the return stack hash table 550 than in the standard table 300. In the particular example illustrated in FIG. 13, there are 256 entries in the standard table 300, but only 16 entries in the return stack hash table 550. In this example implementation, it is assumed that an entry is only made within the return stack hash table 550 if a threshold level of prediction accuracy is not being achieved using the corresponding entry in the standard table 300.

When an entry is made in the return stack hash table 550, then in one example implementation the corresponding entry in the standard table may be invalidated. However, in an alternative implementation, both entries may be maintained, so that either can be used for prediction dependent on prediction accuracy achieved. In the particular example shown in FIG. 13, a threshold detection circuitry 565 may be used to determine when the active pointer confidence of the corresponding entry in the return stack hash table 550 reaches or exceeds a threshold level, at which point the prediction circuitry may switch (as indicated schematically by the multiplexer 560) from using the contents of the relevant tracker entry in the standard table when performing a lookup within the cache to obtain the predicted behaviour, and instead may use the contents of the corresponding entry in the return stack hash table to perform such lookup operations in order to obtain the predicted behaviour.

Figure 14:
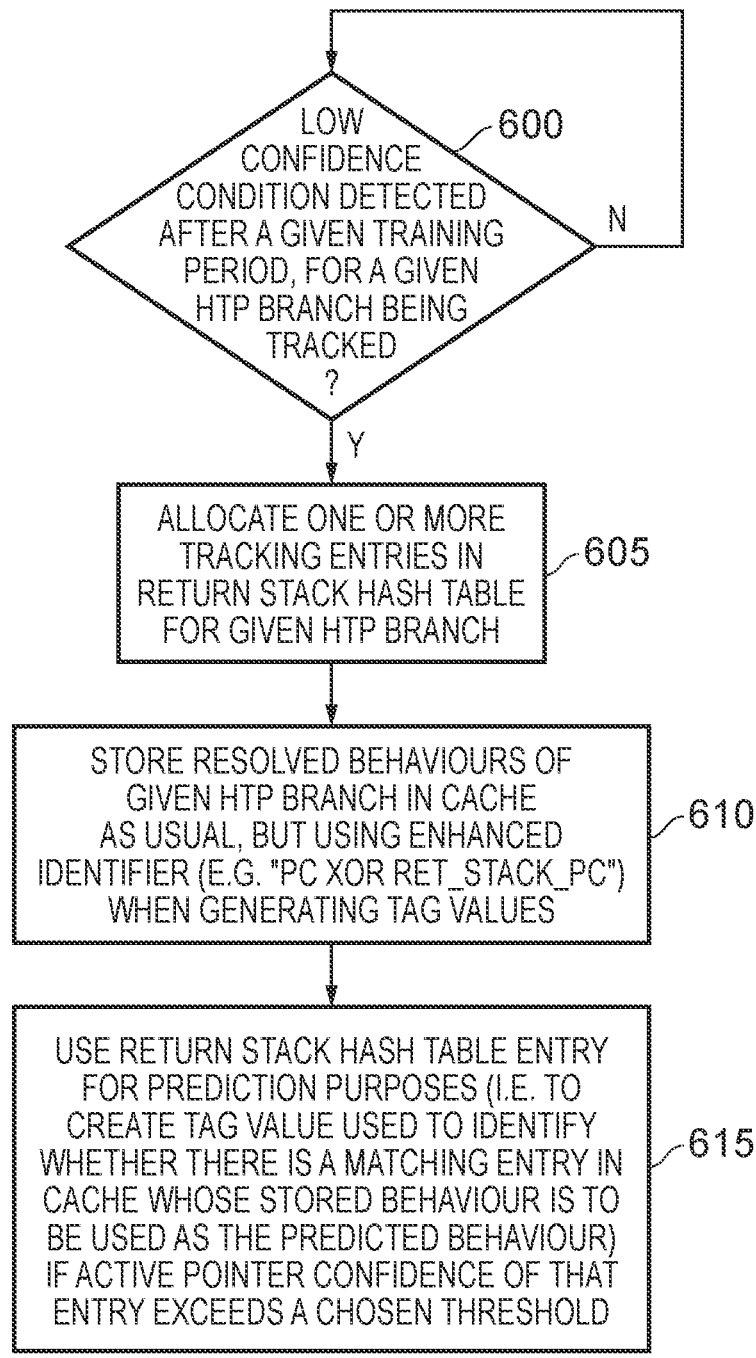
FIG. 14 is a flow diagram illustrating how the additional tracker table of FIG. 13 may be utilised, in accordance with one example implementation.

FIG. 14 is a flow diagram illustrating one way in which the technique illustrated in FIG. 13 may be used. At step 600, it is determined whether a low confidence condition has been detected after a given training period, for a given HTP branch instruction being tracked by a tracker entry in the standard table 300. That training period can be chosen as desired, but by way of example may involve at least one training iteration through all of the pointers, with the best performing of those pointers then being reflected as the current active pointer in the tracker entry of the standard table. If after that process a certain level of mispredictions still occurs when predicting the behaviour of the given HTP branch instruction, this may be treated as elapse of the above-mentioned training period and cause an additional tracker entry to be allocated for that given HTP branch instruction within the return stack hash table 550, with the training process then being performed for that additional tracker entry.

Hence, as shown in FIG. 14, if such a low confidence condition is detected after a given training period, then at step 605 one or more tracking entries are allocated in the return stack hash table for the given HTP branch instruction, and thereafter, at step 610, resolved behaviours of the given HTP branch instruction are stored in the cache as usual, but using the enhanced address identifier referred to earlier when generating tag values, which in one example implementation is achieved by XORing the program counter of the hard to predict branch instruction with the program counter value on a return stack. If the corresponding tracker entry in the standard table is still being used in parallel, then the resolved behaviours can also cause updates to be made using the contents of the entry in the standard table, as discussed earlier.

At step 615, the return stack hash table entry can be used for prediction purposes if the active pointer confidence of that entry exceeds a chosen threshold. This can be achieved by creating a tag value using the contents of the field 555 of the relevant entry in the return stack hash table, in combination with the active pointer identifier and the current value of the active pointer, in order to create a comparison tag value used to determine whether there is a matching entry in the cache, and if so the stored behaviour in that matching entry can be used as the predicted behaviour.

The approach described above with reference to FIGS. 8 to 14 can provide significant benefits, through its use of a shared cache structure to maintain the resolved behaviours of each of the control flow instructions being tracked by the tracker entries of the tracker circuitry, which can lead to a very efficient design when compared with an approach that instead seeks to maintain separate storage structures for each of the tracked control flow instructions into which to store the resolved behaviours of those tracked control flow instructions. In particular, for a given area/size, it is possible using the above described technique to track a larger number of control flow instructions than would be possible were separate storage structures required to be maintained for each of the tracked control flow instructions in order to store their resolved behaviours. Further, it is possible to train each of the entries independently and in parallel, in order to seek to find the most appropriate pointer for any given control flow instruction, which can lead to significantly improved prediction accuracy.

However, such an approach can give rise to some implementation challenges in terms of both power consumption and timing, particularly in systems where the required prediction bandwidth is relatively high. In particular, in some systems it may be necessary to be able to predict the outcome of multiple control flow instructions per clock cycle, and it can be difficult to achieve this required performance if the prediction circuitry needs to access the tracker circuitry and cache circuitry in order to obtain the information necessary to make a prediction. As will be discussed herein with reference to the following figures, an alternative implementation may be provided that can retain the benefits of the above described approach, whilst allowing a higher prediction bandwidth to be achieved. In accordance with such an implementation the above described tracker circuitry and cache circuitry are used to form training circuitry whose aim is to perform a training process in order to determine, for each hard to predict branch instruction tracked by the tracker circuitry, an associated pointer whose pointer value increments in a manner that meets a correlation threshold with occurrences of instances of that hard to predict branch instruction. Then, once a suitable pointer has been identified for a given hard to predict branch instruction, the apparatus is arranged to promote that given hard to predict branch instruction into another structure (referred to herein as prediction circuitry) which can then be accessed when making predictions. The training circuitry is then off the critical path and can be optimised having regard to its main function, which is to perform a training process in order to find the most appropriate pointer to associate with each hard to predict branch, whilst the prediction circuitry can be optimised with regards to its main function, which is to provide high bandwidth predictions. This can lead to better overall power efficiency and storage efficiency, whilst improving performance.

Figure 15:
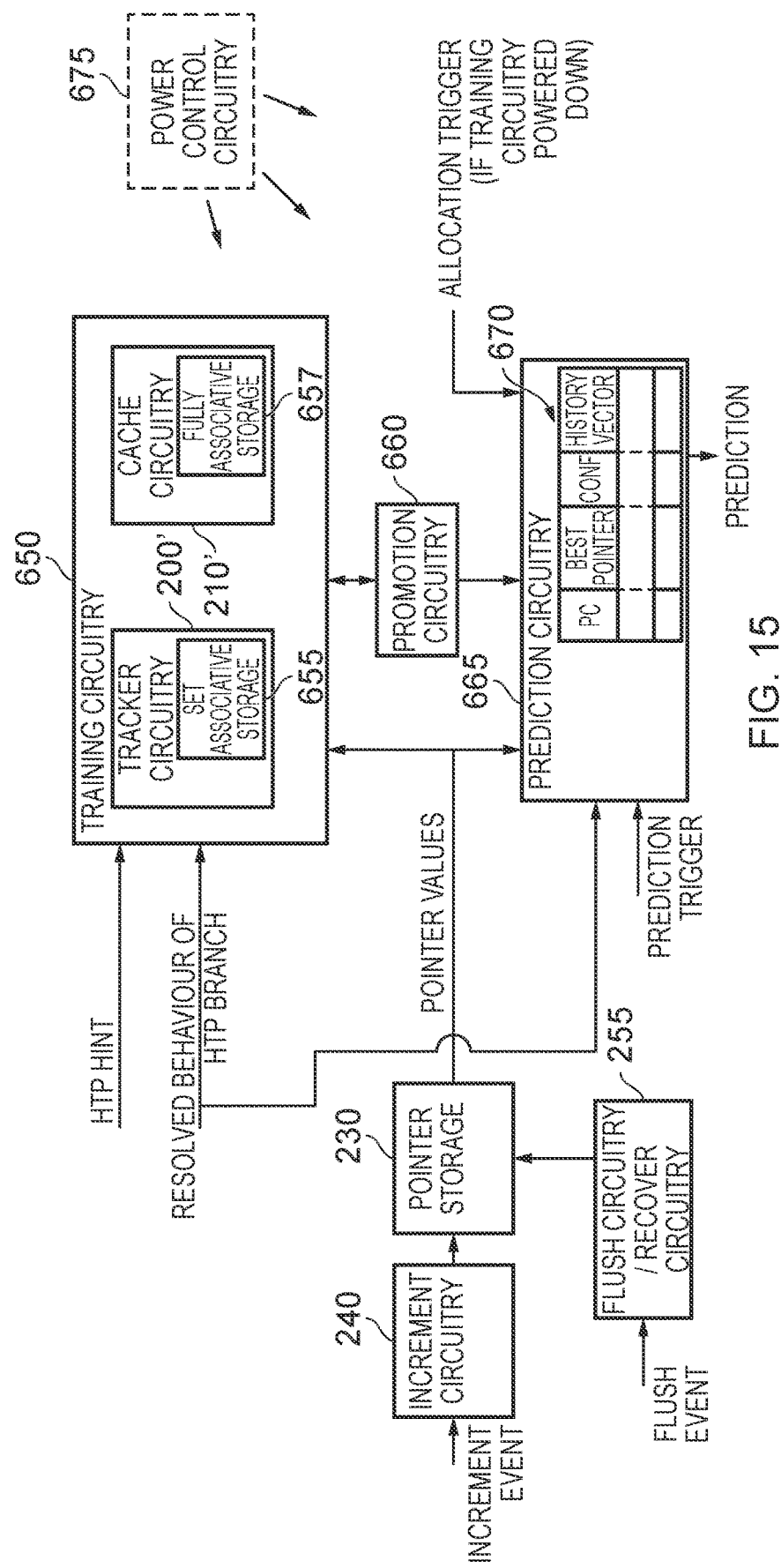
FIG. 15 schematically illustrates an example of a data processing apparatus in accordance with one example implementation.

FIG. 15 is a block diagram schematically illustrating such an implementation, and in this figure components that are common to the example shown earlier in FIG. 8 are designated with the same reference numerals. As shown, training circuitry 650 is provided, which incorporates both tracker circuitry 200' and 210' which generally take the form discussed earlier when describing the tracker circuitry 200 and cache circuitry 210 of FIG. 8. However, since the training circuitry 650 does not need to meet the performance requirements that the tracker circuitry 200 and cache circuitry 210 would be required to meet in order to seek to improve prediction bandwidth, the topologies of the storage components provided by the tracker circuitry 200' and cache circuitry 210' can be chosen so as to seek to be more power and area efficient. By way of example, the tracker circuitry no longer needs to use a fully associative or very highly associative structure, but instead can use a more standard set associative storage structure such as a two-way set associative storage structure. This can significantly reduce the area and power consumption requirements, which can for example allow the tracker circuitry to be implemented in random access memory. Further, there is more flexibility in the topology used for the cache circuitry 210'. In one example implementation a fully associative storage structure is still used to implement the storage in the cache circuitry, but the size of that storage can be reduced, as will be discussed in more detail later.

As shown in FIG. 15, promotion circuitry 660 is provided that can be used to allocate a given hard to predict branch instruction being tracked by the training circuitry 650 into a prediction entry of table 670 of the prediction circuitry 665 when the training circuitry 650 has identified a suitable associated pointer for that given hard to predict branch instruction (i.e. an associated pointer whose pointer value increments in a manner that meets a correlation threshold with occurrences of instances of that hard to predict branch instruction). The prediction entries of table 670 can be organised in much the same way as the entries of the active table 150 described earlier with reference to FIG. 7. Hence, each prediction entry may include a program counter field to identify an address of the HTP branch instruction being tracked in that entry, a best pointer identifier field to identify the pointer that is considered to be the best pointer for the HTP branch instruction being tracked (which will be specified by the promotion circuitry 660 at the time the allocation takes place, based on the associated pointer that the training circuitry has identified), and a confidence indication used to determine when there is sufficient confidence in the contents of the prediction entry to enable predictions to be made using that entry. That confidence indication may be initialised to a given value, for example the value of the associated pointer confidence indication maintained in the relevant tracker entry for the hard to predict branch instruction now being allocated into the prediction circuitry. A history vector field may also be provided which can be used to store a rotating bit vector such as a rotating bit vector of the form 175 described earlier when discussing FIG. 7. Hence each entry in the bit vector may be used to identify a taken or not taken prediction, and may have a valid bit to identify whether a valid taken or not taken prediction has been stored in that entry.

There are various ways in which the history vector may be populated in response to a prediction entry being allocated for a given control flow instruction. For instance, in one implementation the history vector may be populated at the time the prediction entry is allocated, for example by retrieving from the cache circuitry 210' the resolved behaviour for one or more instances of the given control flow instruction. Alternatively, the history vector may instead be populated after the prediction entry has been allocated, using the resolved behaviour for one or more subsequently observed instances of the given control flow instruction, which can be forwarded to the prediction circuitry 665 in addition to being forwarded to the training circuitry 650. As a yet further example approach, a hybrid approach could be taken, where the history vector could be at least partly populated using information retrieved from the cache circuitry 210', but could then be supplemented in response to each subsequently observed instance of the given control flow instruction.

The pointer storage 230, increment circuitry 240 and flush circuitry/recover circuitry 255 can operate in the same way as described when discussing those components in relation to the example implementation of FIG. 8. The pointer values retrieved from the pointer storage 230 can be provided to the training circuitry 650 and/or the prediction circuitry 665, as required.

In response to a prediction trigger received by the prediction circuitry 665, then it can be determined whether a valid prediction entry exists for the hard to predict branch instruction associated with the prediction trigger, and if so it can be determined whether the confidence indication in that prediction entry meets a certain prediction threshold. If it does, then an element within the history vector can be identified based on the best pointer indicated for that hard to predict branch instruction within the prediction entry, and the current pointer value of that pointer as retrieved from the pointer storage 230, and if that element is valid then the resolved behaviour stored in that element can be used as the predicted behaviour output by the prediction circuitry 665.

In an optional implementation power control circuitry 675 may be provided to allow the apparatus shown in FIG. 15 to be operated in various different power modes. These will be discussed later with reference to FIGS. 22 and 23, but in one possible power mode it may be the case that the training circuitry 650 is turned off. In that case, an allocation trigger may be used to directly allocate entries into the prediction circuitry 665 in the event of a misprediction threshold being reached for a given hard to predict branch instruction (for example if a reliable prediction for that hard to predict branch instruction has proven not to be possible using other prediction mechanisms such as the earlier described TAGE prediction mechanism).

Figure 16:
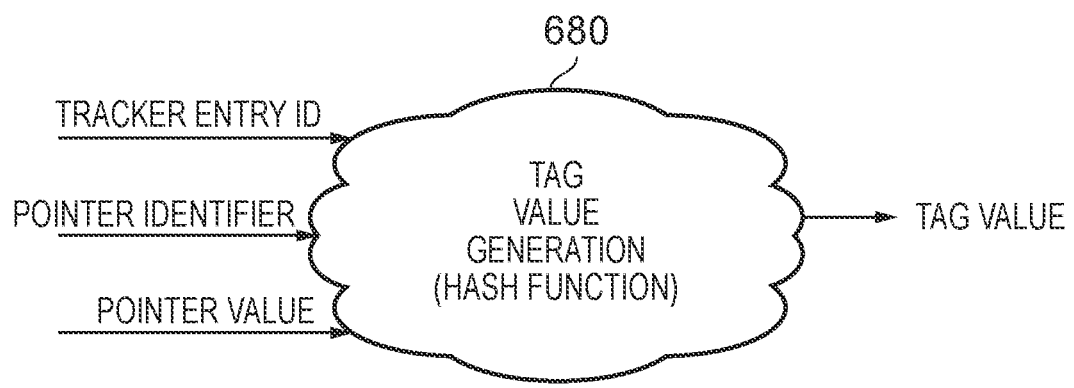
FIG. 16 schematically illustrates how a tag value may be generated in accordance with one example implementation.

FIG. 16 schematically illustrates a tag value generation function 680 that may be performed by cache access circuitry associated with the cache circuitry 210' when accessing the cache storage within that cache circuitry. In particular, the tag value generation function can be used to generate a tag value that, when allocating a resolved behaviour into a cache entry, can be stored in association with that allocated resolved behaviour, and when performing lookup operations can be used to generate a comparison tag value that can then be compared with the tag values stored in allocated cache entries. In the example discussed earlier with reference to FIG. 8, the tag value generation function may be arranged to take as inputs an identifier of the hard to predict branch instruction under consideration, for example at least a portion of the program counter (PC) value, an indication of the relevant pointer, and an indication of the current pointer value of that pointer, and can then be arranged to apply a suitable function, such as a hash function, in order to generate the tag value. In the example illustrated in FIG. 16, the PC-based indication of the hard to predict branch instruction is replaced with a tracker entry identifier. Such an approach can enable the size of the cache circuitry 210' to be reduced, as the identifier of the tracker entry will typically be smaller than a PC-based identifier of the control flow instruction and hence less space may be required within the cache to hold the associated tag values. Further, it has been found that such a physical identifier of the tracker entry is sufficient and stable enough to use when generating a tag value, since once a control flow instruction has been allocated to a tracker entry, it can remain allocated in that same tracker entry for a relatively long time, for example at least until an associated pointer has been found during the training process that enables the correlation threshold to be met, and hence causes promotion of the control flow instruction into the prediction circuitry 665.

Figure 17:
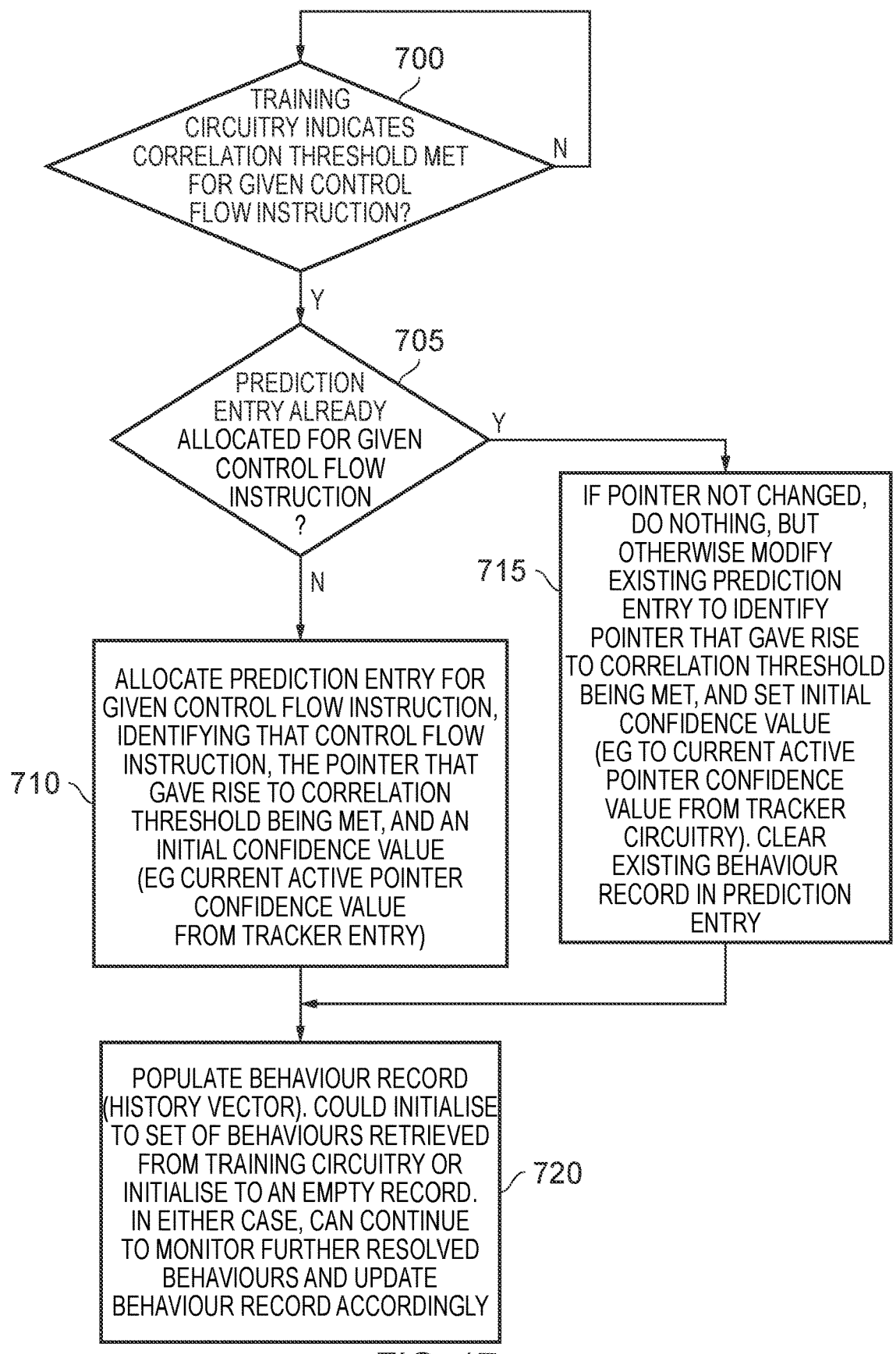
FIG. 17 is a flow diagram indicating steps that may be taken when a correlation threshold is considered to be met for a given control flow instruction being tracked by the training circuitry of FIG. 15, in accordance with one example implementation.

FIG. 17 is a flow diagram illustrating steps performed by the apparatus of FIG. 15 upon a determination by the training circuitry that the correlation threshold has been met in respect of an active pointer indicated for a given control flow instruction (hard to predict branch instruction) being tracked in a tracker entry of the tracker circuitry 200'. In one example implementation the meeting of the correlation threshold may be detected when the active pointer confidence indication indicates a desired level of confidence. When at step 700 such a condition is detected, then at step 705 it is determined whether a prediction entry has already been allocated for the given control flow instruction. If not, then the process proceeds to step 710 where the promotion circuitry 660 communicates with the prediction circuitry 665 in order to cause a prediction entry to be allocated for the given control flow instruction. Within that allocated prediction entry, the control flow instruction will be identified (for example by storing the PC value of that instruction), the pointer that gave rise to the correlation threshold being met will also be identified as the best pointer within the prediction entry, and an initial confidence value will be set within the confidence field of the prediction entry. In one example implementation the initial conference value will be set to the current active pointer confidence value held in the corresponding tracker entry of the tracker circuitry 200'.

Thereafter, at step 720, the behaviour record (which in the example of FIG. 15 takes the form of a history vector) will be populated. As discussed earlier, this behaviour record could be initialised to a set of behaviours retrieved from the cache circuitry 210' of the training circuitry 650, or could be initialised to be an empty record. In either case, the prediction circuitry 665 can continue to monitor further resolved behaviours for the given control flow instruction that has now been allocated into the prediction entry, and can update the behaviour record accordingly based on those observed resolved behaviours.

If at step 705, it is determined that a prediction entry has already been allocated for the given control flow instruction, then the process proceeds to step 715 where, if the active pointer within the tracker entry has not been changed no further action is needed, but otherwise the existing prediction entry will be modified to identify the updated pointer that has given rise to the correlation threshold being met, and to set of initial confidence value for that pointer. As discussed earlier, this initial confidence value can be set to the current active pointer confidence value held in the corresponding tracker entry of the tracker circuitry. The existing behaviour record in the prediction entry will then be cleared, whereafter the process will proceed to step 720 (assuming the existing prediction entry has been modified at step 715—if the pointer has not changed, and hence the prediction entry is not modified, then step 720 will not be performed).

In one example implementation, the process of FIG. 17 is performed on an ongoing basis, so that whenever the training circuitry determines, for a given tracker entry, that the active pointer confidence indication for the current active pointer indicates that the correlation threshold has been met, the process of FIG. 17 is performed. This ensures that as soon as a desired level of confidence has been reached in respect of a pointer associated with a given control flow instruction, a prediction entry can be populated with that information to allow predictions to thereafter be made. However, if desired, in an alternative implementation the process of FIG. 17 could be performed at discrete points in time, for example at the end of each training period (which in one example implementation may be deemed to occur in response to the training counter reaching a determined threshold for a given tracker entry) and hence at the point in time where it is decided whether the currently tracked training pointer should become the new active pointer.

Figure 18:
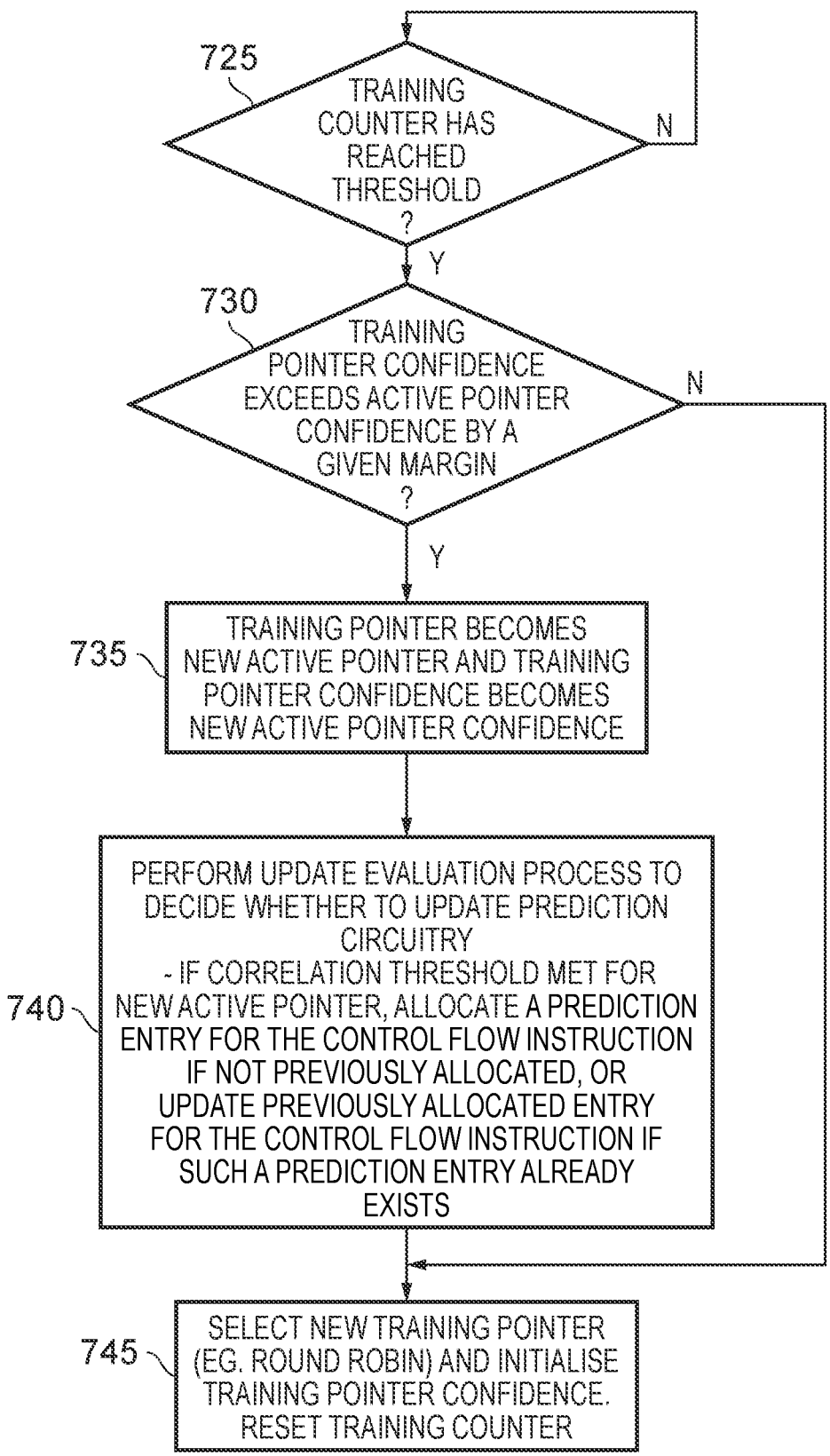
FIG. 18 is a flow diagram illustrating steps that may be performed when a training counter is considered to have reached a threshold level for a particular tracker entry of the tracker circuitry, in accordance with one example implementation.

FIG. 18 is a flow diagram illustrating the steps that can hence be taken upon determining that the training counter (for example the training count as maintained within the field 335 of a tracker entry as shown in FIG. 9) has reached a threshold level. If at step 725 it is determined that the training counter has reached the threshold level for a given tracker entry, then it is determined at step 730 whether the training pointer confidence maintained within that tracker entry exceeds the active pointer confidence maintained within that tracker entry by a given margin. The given margin can be chosen as a design parameter, but is intended to ensure that thrashing does not occur in a prediction entry of the prediction circuitry by avoiding repetitive updates to that prediction entry to cycle back and forth between different indicated pointers.

If at step 730 it is determined that the training pointer confidence does indeed exceed the active pointer confidence by the given margin, then at step 735 the training pointer becomes the new active pointer and the training pointer confidence becomes the new active pointer confidence. At step 740, an update evaluation process can then be performed to decide whether to update the prediction circuitry. In particular, if it is determined that the correlation threshold has been met for the new active pointer (i.e. if the new active pointer confidence indicates a level of confidence that is sufficiently high) then a prediction entry may be allocated for the control flow instruction identified in the tracker entry if a prediction entry has not previously been allocated for that control flow instruction, or instead a previously allocated prediction entry may be updated for the control flow instruction if such a prediction entry already exists. The process discussed earlier with reference to FIG. 17 can be used at this point to populate the allocated entry with the required information.

At step 745, a new training pointer is then selected using a suitable selection algorithm, for example a round robin algorithm that merely cycles through the available pointers, and the training pointer confidence can then be initialised, for example to a zero confidence level. The training counter can then be reset in order to begin another training period. If at step 730 it is determined that the training pointer confidence does not exceed the active pointer confidence by the given margin, then the process can proceed directly to step 745 and steps 735 and 740 are not performed.

Whilst step 740 is shown as being performed between steps 735 and 745 in FIG. 18, this is merely for ease of illustration, and it will be appreciated that in practice step 740 could be performed in parallel with step 745, or indeed could be performed after step 745.

Figure 19:
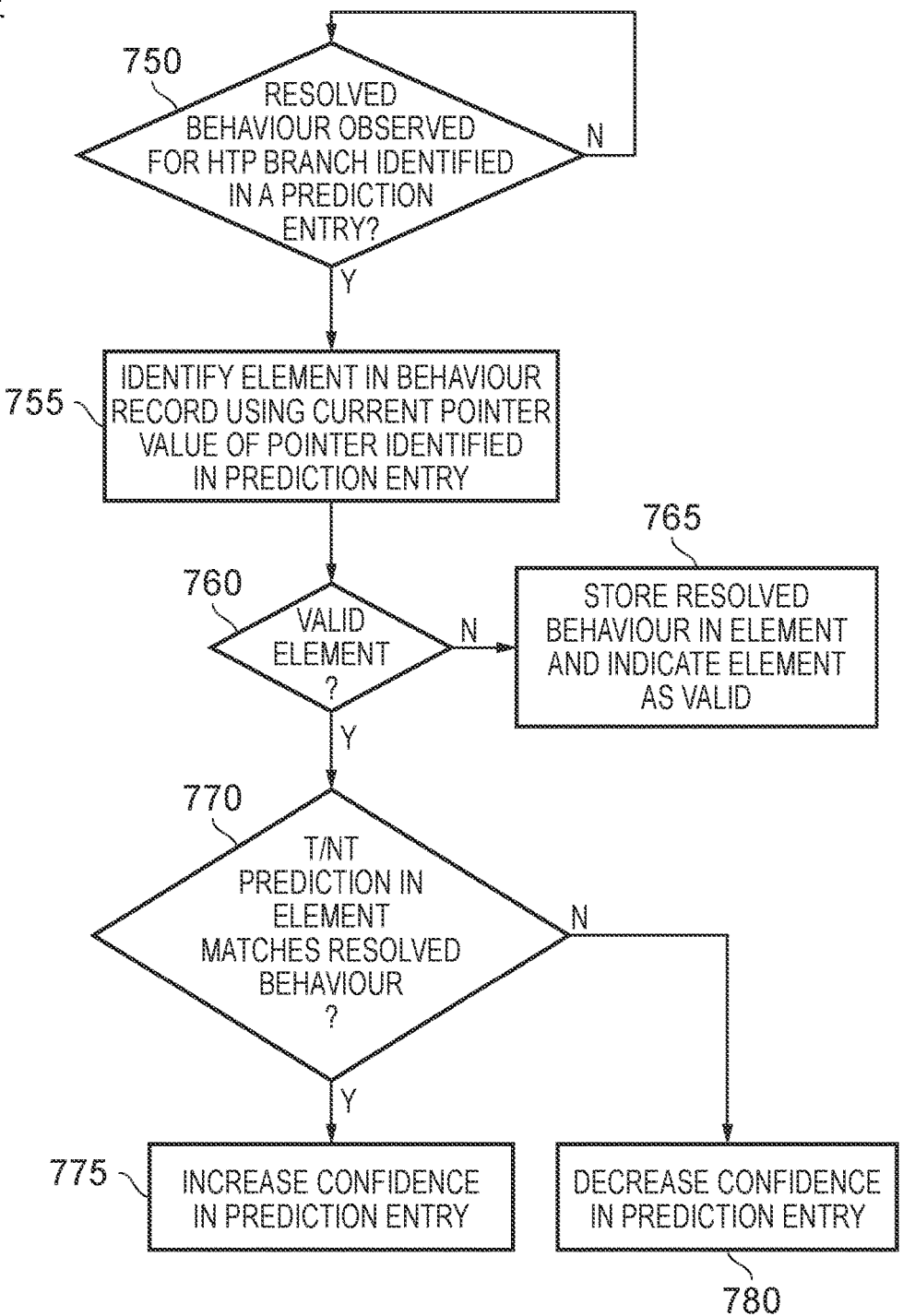
FIG. 19 is a flow diagram illustrating the operation of the prediction circuitry upon observing a resolved behaviour for a control flow instruction allocated into one of the prediction entries, in accordance with one example implementation.

FIG. 19 is a flow diagram illustrating the operation of the prediction circuitry when a resolved behaviour of a hard to predict (HTP) branch instruction is observed. At step 750, it is determined whether a resolved behaviour has been observed for an HTP branch instruction identified in a prediction entry of the prediction circuitry 665. If not, no action is taken and the process remains at step 750 until such a resolved behaviour is observed. When a resolved behaviour is observed for an HTP branch instruction identified in a prediction entry, then at step 755 an element in the behaviour record of the relevant prediction entry is identified using the current pointer value of the pointer that is identified in that prediction entry. Hence, in the example where the behaviour record takes the form of a history vector, then the pointer value of the relevant pointer is used to identify a particular element within that history vector.

At step 760, it is determined whether that element is marked as valid. In one example implementation, the history vector takes the form of the rotating bit vector 175 discussed earlier with reference to FIG. 7, and hence each element has a valid field (which may for example be set to indicate that the entry is valid, and cleared to indicate that the entry is not valid) and a resolved behaviour identification field (for example to identify whether the resolved behaviour is a taken behaviour or a not taken behaviour). If the element is not marked as valid, then at step 765 the observed resolved behaviour is stored in the element and the valid field is set to indicate that the element is valid.

If at step 760 it is determined that the element is marked as valid, then it is determined at step 770 whether the taken/not taken prediction behaviour stored in the element matches the observed resolved behaviour. If it does, then the confidence field in the prediction entry is updated to indicate an increased confidence, whereas if the observed resolved behaviour does not match the behaviour stored in the element the process instead proceeds to step 780 where the confidence in the prediction entry is updated to indicate a decreased confidence.

Figure 20:
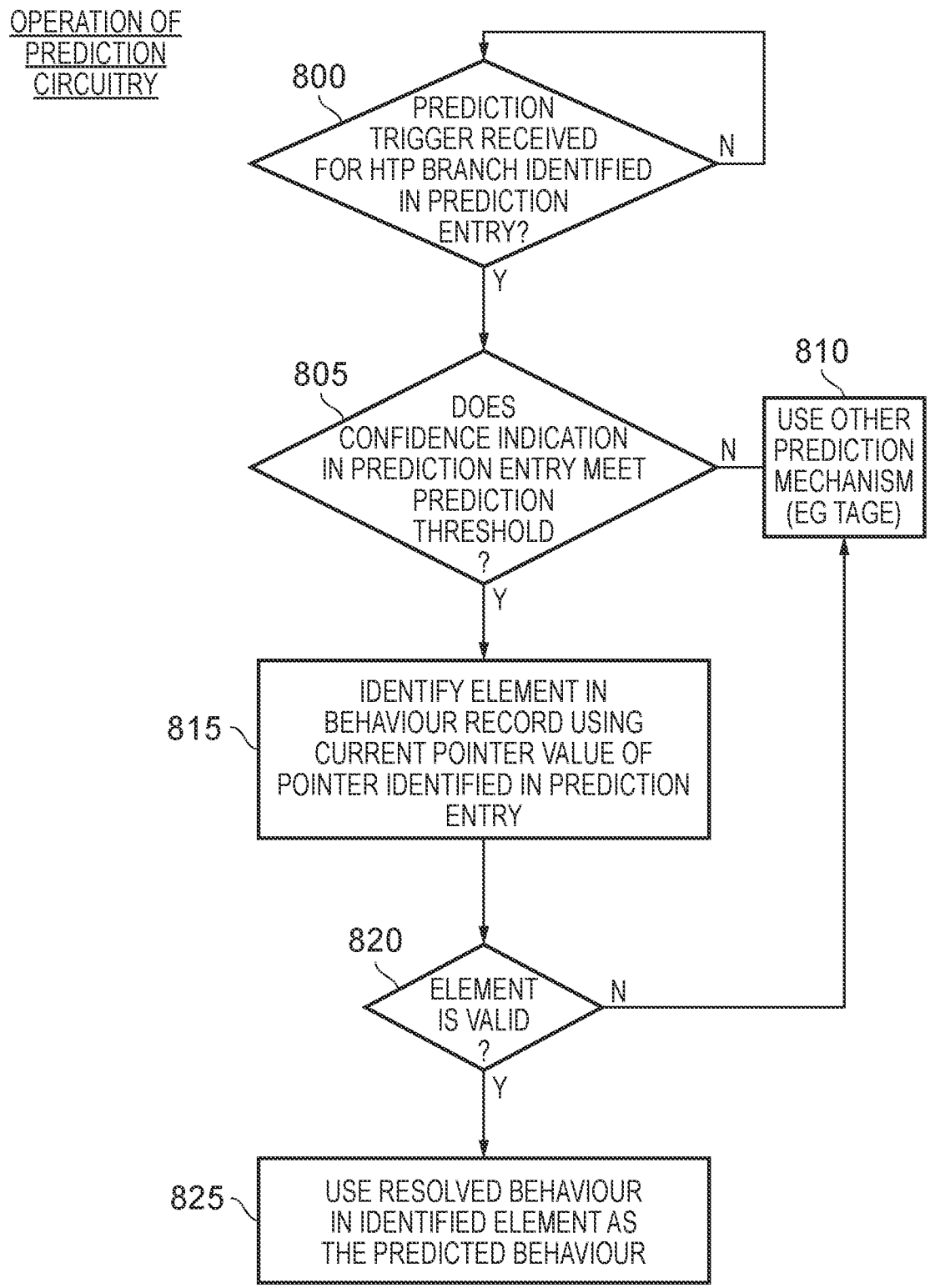
FIG. 20 is a flow diagram illustrating the operation of prediction circuitry upon detection of a prediction trigger, in accordance with one example implementation.

FIG. 20 illustrates the operation of the prediction circuitry in response to a prediction trigger. When such a prediction trigger is detected at step 800 (for example due to an HTP branch instruction identified in a prediction entry being detected in the instruction flow), it is determined at step 805 whether the confidence indication in the prediction entry meets a determined prediction threshold, and if not then at step 810 a different prediction mechanism is used to make the prediction, for example the earlier discussed TAGE predictor.

However, if the confidence indication does meet a specified prediction threshold, then at step 815 an element in the behaviour record of the relevant prediction entry is identified using the current pointer value of the pointer identified in that prediction entry. It is then determined at step 820 whether the element identified at step 815 is marked as valid, and if not the process proceeds to step 810 where a different prediction mechanism is used to make the prediction. However, if the element is determined at step 820 to be marked as valid, then at step 825 the resolved behaviour stored in that identified element may be used as the predicted behaviour.

As will be apparent from the earlier discussions, a variety of different pointers may be established within the pointer storage, which all have associated different rules used to determine when the values of those pointers get updated in response to increment events. One particular type of pointer that could be used as one of the pointers is a pointer whose value never updates in response to any increment events, and hence remains a static value, such a pointer also being referred to herein as an IDX1 pointer. When such a pointer is chosen as the associated pointer for a hard to predict branch instruction, this means that the predicted behaviour will always be the last observed behaviour. Hence, the behaviour record of the associated prediction entry only holds a single observed behaviour. In order to maintain the correct information within that behaviour record, whenever an instance of an HTP branch instruction gets retired from the processing pipeline, and that HTP branch instruction is being tracked in a prediction entry of the prediction circuitry and has as its associated pointer the IDX1 pointer, then the behaviour record element storing the last observed behaviour of that branch instruction is invalidated. Then, on the next observed behaviour of that branch instruction, the element is repopulated and set to valid, so that that observed behaviour can then be used as a predicted behaviour for a subsequent instance of the HTP branch instruction.

Figure 21:
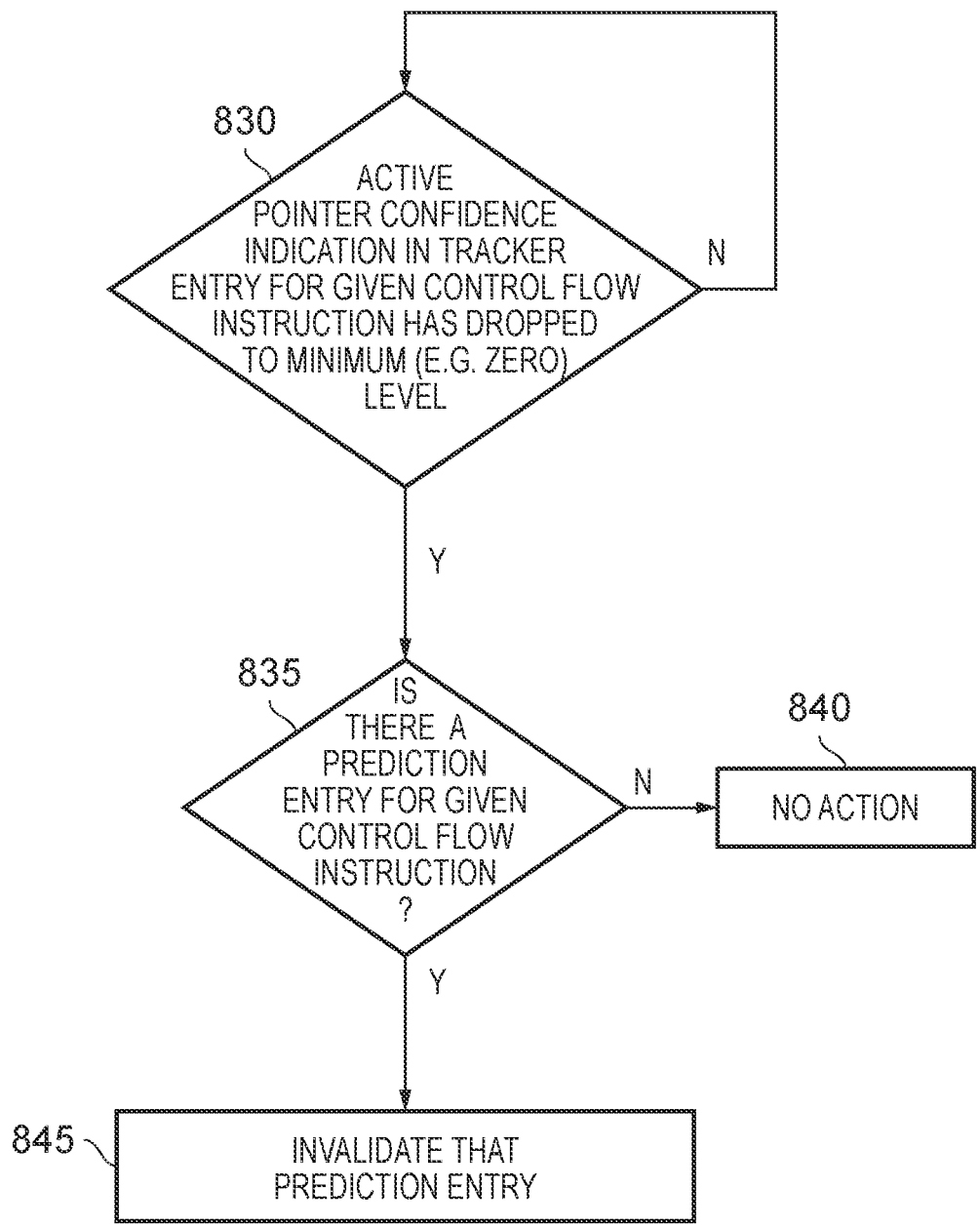
FIG. 21 is a flow diagram illustrating steps that may be taken when the active pointer confidence indication in a tracker entry drops to a determined minimum level, in accordance with one example implementation.

In some instances, it may be determined to be appropriate to invalidate an entry in the prediction circuitry. One example scenario where this may occur is illustrated by the flow diagram of FIG. 21. In particular, at step 830, it is determined whether the active pointer confidence indication in a tracker entry for a given control flow instruction has dropped to a minimum level. The minimum level may be implementation dependent, but in one example implementation is a zero level. At this point, the training circuitry has decided that the currently indicated active pointer is not expected to enable an accurate prediction to be made for the given control flow instruction. However, it is possible that a prediction entry still exists for the given control flow instruction. Hence, at step 835, it is determined whether there is a prediction entry for the given control flow instruction. If not, then no further action is required (as indicated by step 840), but if there is a prediction entry for the given control flow instruction, the process proceeds to step 845 where that prediction entry is invalidated. This will prevent the prediction circuitry making any further prediction for that given control flow instruction (at least until such time as the training circuitry determines in the future that there is an associated pointer for the given control flow instruction that does meet the correlation threshold, at which point the promotion circuitry can reallocate an entry in the prediction circuitry for the given control flow instruction identifying the relevant pointer).

In some example implementations, the apparatus may be configured so that it can operate in a variety of different power modes. In particular, in one example implementation the apparatus may further comprise power control circuitry 675 as illustrated earlier in FIG. 15, which can be used to selectively switch the apparatus between different power modes of operation in response to at least one power mode transition trigger.

Figure 22:
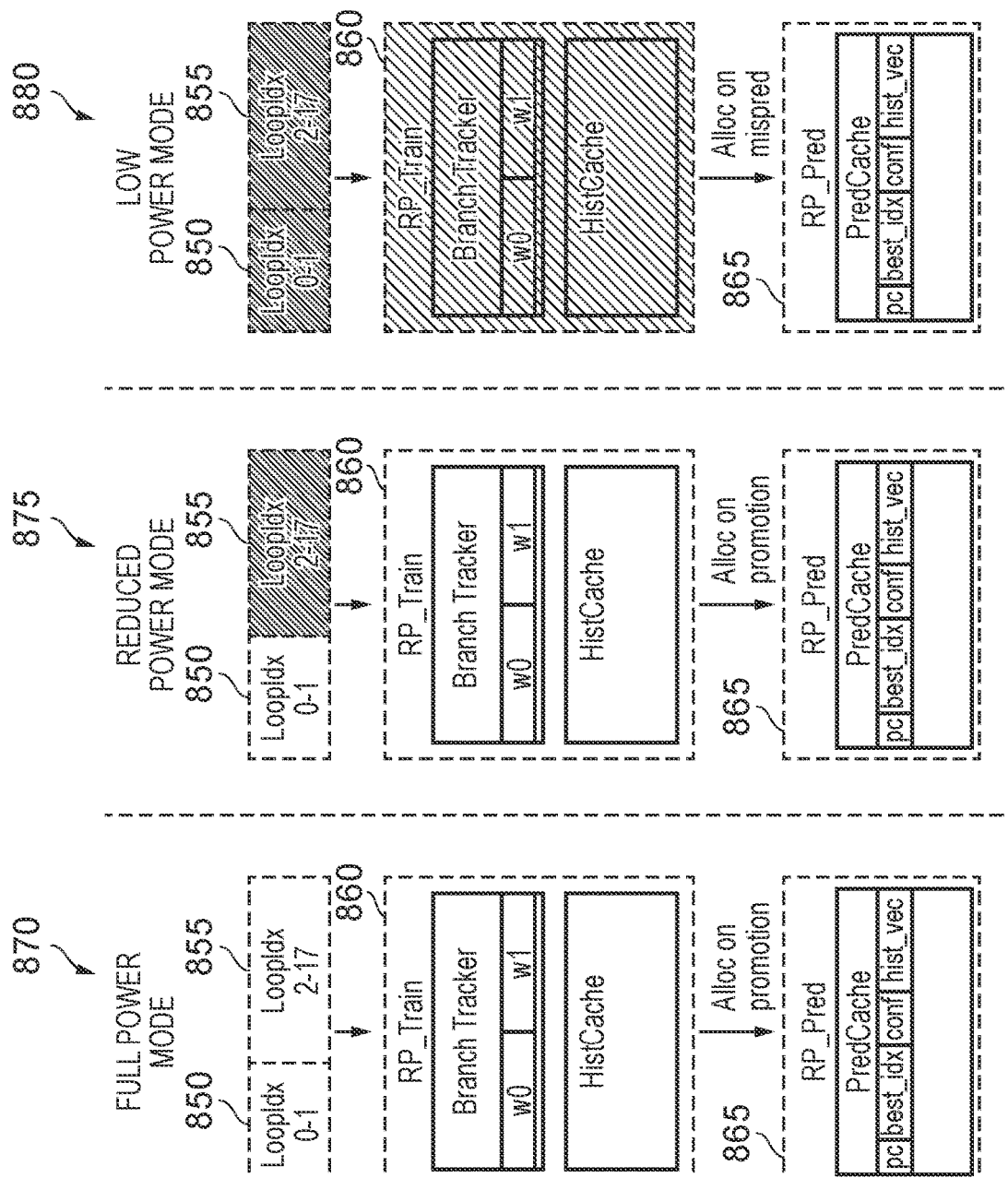
FIG. 22 schematically illustrates how the apparatus may be operated in different power modes, in accordance with one example implementation.

FIG. 22 schematically illustrates three different power modes 870, 875, 880. The RP_Train block 860 corresponds to the training circuitry 650 discussed earlier, and hence has a branch tracker block and a history cache block as shown, and the RP_Pred block 865 corresponds to the prediction circuitry 665 discussed earlier, and has a prediction cache in which the various prediction entries can be maintained.

In the examples shown, it is assumed that the apparatus supports the use of 18 different pointers (referred to in FIG. 22 as loop indexes). As discussed earlier, loop index 0 (also referred to herein as the IDX0 pointer) is a pointer whose value is incremented upon occurrence of every increment event, and loop index 1 (also referred to herein as the IDX1 pointer) is a pointer whose value never updates in response to any increment events and hence remains a static value. The other loop indexes 2 to 17 may have functions associated with them to determine if and when the pointer values of those pointers should be incremented in response to an increment event, and as discussed earlier the aim of the various pointers is that overall they increment differentially over time. Whilst any one of the pointers may, for a given control flow instruction, be determined to be a pointer whose pointer value increments in a manner that meets correlation threshold with occurrences of instances of that given control flow instruction, in some implementations it has been found that the IDX0 and IDX1 pointers are used more regularly than the other pointers.

Hence, whilst in the full power mode 870 all 18 of the pointers maintained by the pointer selection circuitry 850, 855 may be available for use by the training circuitry 860 in order to seek to identify, for each given HTP branch instruction being tracked, an associated pointer whose pointer value increments in a manner that meets a correlation threshold with occurrence of instances of that HTP branch instruction, if it is desired to operate with reduced power, use of a subset of the pointers, namely pointers 2 to 17, may be disabled, so that the training circuitry 860 only uses the IDX0 and IDX1 pointers during training and the pointer selection circuitry 855 is not used. By adopting such an approach, the filtering performed by the training circuitry is still enabled, so the prediction entries are only allocated once the confidence threshold has been met for a given control flow instruction, but significantly less pointers are used during the training process, hence reducing power consumption. This can still provide good performance in situations where reliable predictions can be made for a significant number of HTP branch instructions using either the IDX0 or IDX1 pointers.

However, in situations where it is determined that the prediction accuracy is not benefiting from the pointer selection mechanism performed by the training circuitry, or where it is determined that there is a relatively low number of hard to predict branch instructions that cannot be accurately predicted using other provided prediction mechanisms (such as the earlier described TAGE predictor), then it may be decided to significantly reduce the power consumption by disabling the training circuitry 860 and thus disabling all of the pointer selection circuitry 850, 855. In such a low-power mode, allocations into the prediction circuitry 865 may occur directly in response to a misprediction level been detected for a given control flow instruction, for example if it is detected that a reliable prediction cannot be achieved from the default prediction mechanism such as the earlier described TAGE prediction mechanism. When performing such an allocation, a predetermined pointer will be assumed, and in one example implementation this is the IDX0 pointer. Hence only the IDX0 pointer needs updating based on increment events, but that pointer value can be output directly from the pointer storage to the prediction circuitry without the need for any multiplexing between different pointers. It has been found that such a low-power mode 880 can still enable useful predictions to be made for HTP branches, whilst significantly reducing the overall power consumption associated with the HTP prediction mechanism branch.

Figure 23:
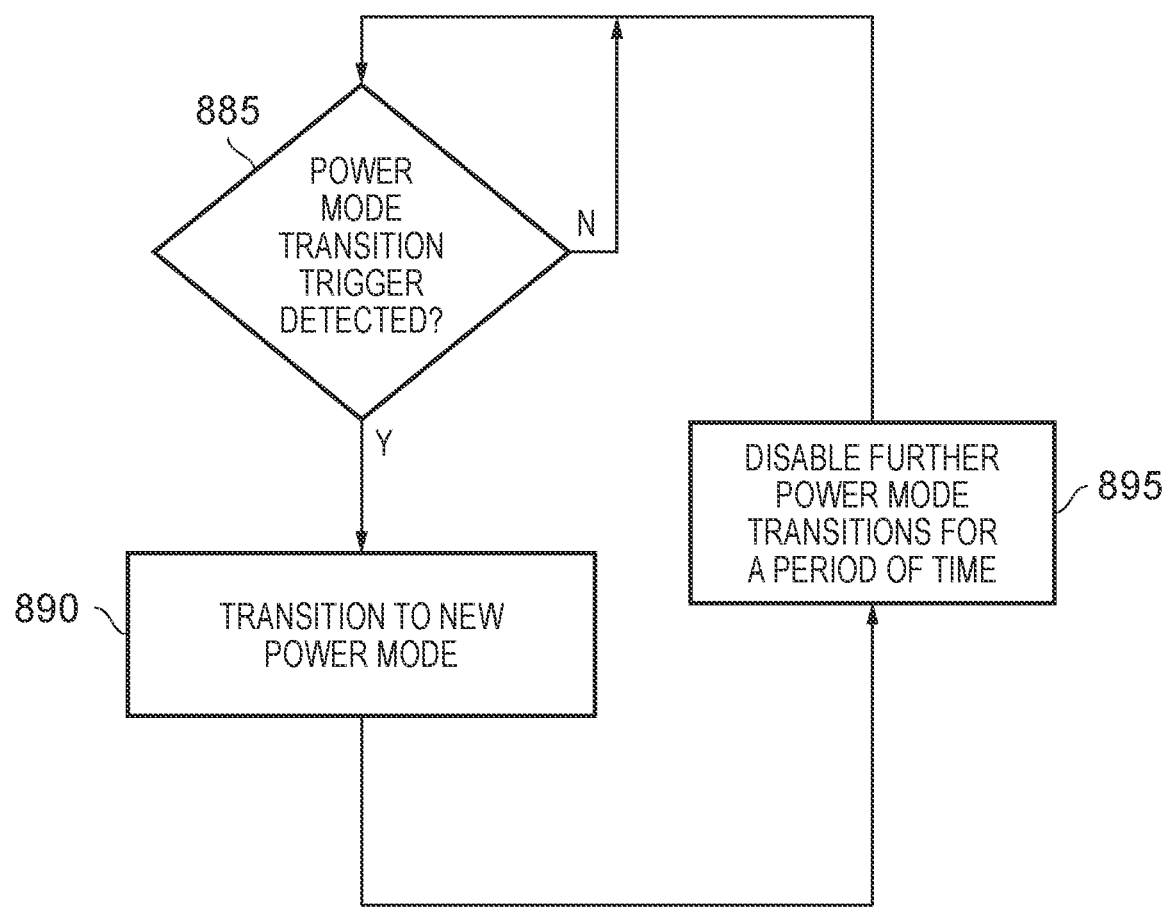
FIG. 23 is a flow diagram illustrating the use of power mode transition triggers to control the power mode of operation of the apparatus, in accordance with one example implementation.

FIG. 23 schematically illustrates the operation of the apparatus in different power modes. In particular, at step 885, it is determined whether a power mode transition trigger has been detected, and if so at step 890 the apparatus is arranged to transition to the new power mode. Each power mode transition trigger may be defined in a variety of ways, but may take into account factors such as the frequency with which a prediction is made using the prediction circuitry (in some implementations the prediction circuitry will only make a prediction when the prediction made would differ from the prediction made by a default prediction mechanism such as the earlier described TAGE prediction mechanism), the rate at which control flow instructions are being allocated into entries of the prediction circuitry, etc. Hence, by way of example, if the rate at which predictions are being made using the prediction circuitry reduces, and/or the rate at which control flow instructions are being allocated into entries of the prediction circuitry reduces, then it may be decided to enter a lower power mode of operation, whilst conversely if the rate at which predictions are being made increases, and/or the rate at which control flow instructions are being allocated increases, then it may be decided to enter a higher power mode of operation.

As indicated by step 895, once a transition to a different power mode has taken place, then any other change to the power mode may be disabled for a period of time, prior to again monitoring at step 885 for a subsequent power mode transition trigger. This can avoid a situation where the apparatus is frequently transitioning between two adjacent power modes.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 24:
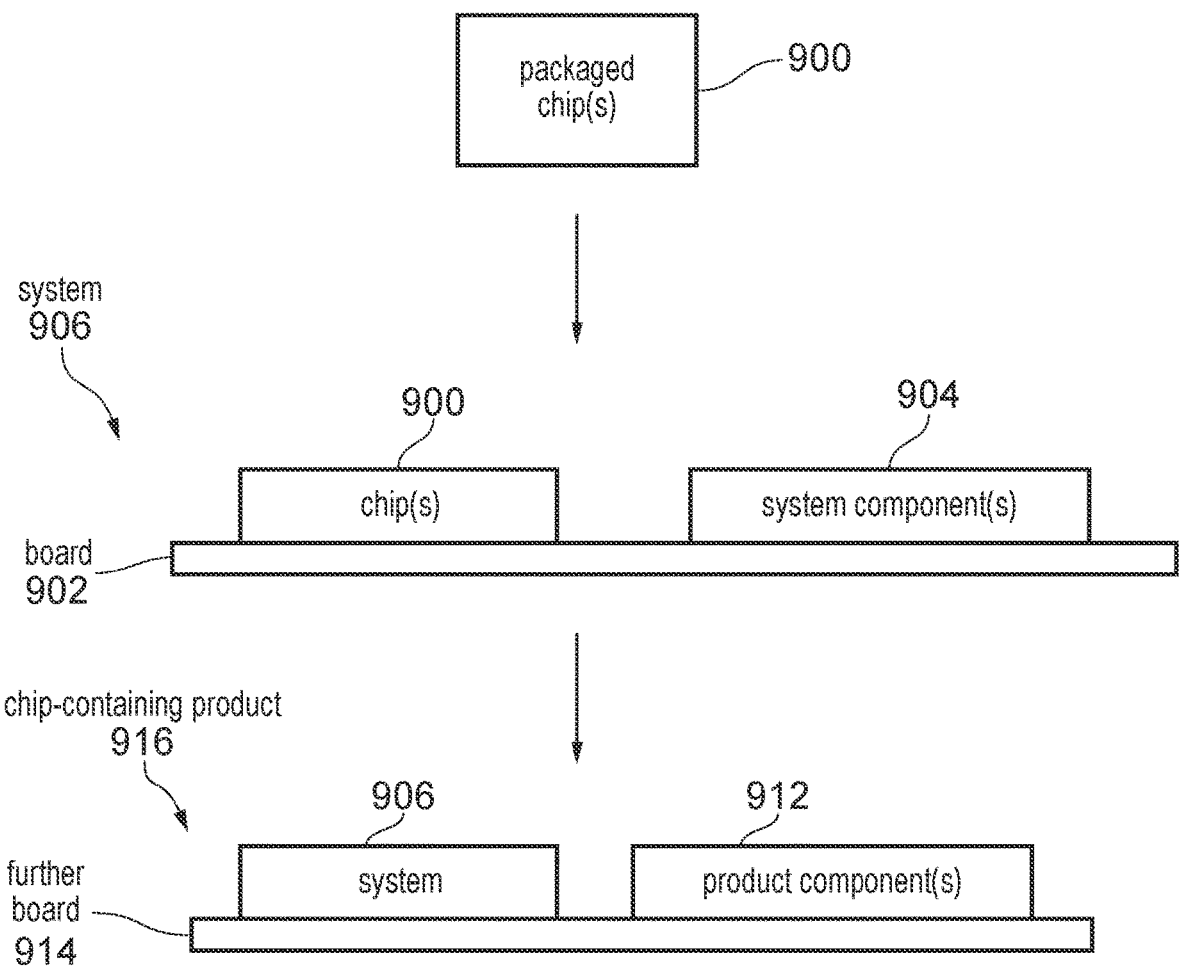
FIG. 24 illustrates an example of a system and chip-containing product.

As shown in FIG. 24 one or more packaged chips 900, with the apparatus described above implemented on one chip or distributed over two or more of the chips, are manufactured by a semiconductor chip manufacturer. In some examples, the chip product 900 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 900 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 900 are assembled on a board 902 together with at least one system component 904. For example, the board may comprise a printed circuit board. The board substrate may be made of any of a variety of materials, e.g. plastic, glass, ceramic, or a flexible substrate material such as paper, plastic or textile material. The at least one system component 904 comprise one or more external components which are not part of the one or more packaged chip(s) 900. For example, the at least one system component 904 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 916 is manufactured comprising the system 906 (including the board 902, the one or more chips 900 and the at least one system component 904) and one or more product components 912. The product components 912 comprise one or more further components which are not part of the system 906. As a non-exhaustive list of examples, the one or more product components 912 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 906 and one or more product components 912 may be assembled on to a further board 914.

The board 902 or the further board 914 may be provided on or within a device housing or other structural support (e.g. a frame or blade) to provide a product which can be handled by a user and/or is intended for operational use by a person or company.

The system 906 or the chip-containing product 916 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Some example configurations are set out in the following numbered clauses:

1. An apparatus comprising:
    pointer storage to store pointer values for a plurality of pointers;
    increment circuitry, responsive to a series of increment events, to differentially increment the pointer values of the pointers;
    training circuitry comprising tracker circuitry to maintain a plurality of tracker entries and cache circuitry to maintain a plurality of cache entries, each tracker entry to identify a control flow instruction, and each cache entry to store a resolved behaviour of an instance of a control flow instruction identified by a tracker entry of the tracker circuitry;
    wherein the training circuitry is arranged, for a given control flow instruction identified in a given tracker entry, to perform a training process to seek to determine, as an associated pointer for the given control flow instruction, a pointer from amongst the plurality of pointers whose pointer value increments in a manner that meets a correlation threshold with occurrence of instances of the given control flow instruction;
    prediction circuitry; and
    promotion circuitry, responsive to detection of the correlation threshold being met for the given control flow instruction, to allocate a prediction entry within the prediction circuitry to identify the given control flow instruction and the associated pointer, and to establish within the prediction entry a behaviour record identifying the resolved behaviour for one or more instances of the given control flow instruction, where the behaviour record is arranged such that each resolved behaviour is associated with the pointer value of the associated pointer at the time that resolved behaviour was observed;
    wherein the prediction circuitry, responsive to a prediction trigger associated with a replay of a given instance of the given control flow instruction, is arranged to determine, in dependence on a current pointer value of the associated pointer, a predicted behaviour of the given instance of the given control flow instruction from the behaviour record within the prediction entry.

2. An apparatus as in Clause 1, wherein:
    each cache entry is arranged to store a resolved behaviour of an instance of a control flow instruction identified by a tracker entry of the tracker circuitry along with an associated tag value generated in dependence on a chosen pointer when the resolved behaviour was allocated into that cache entry; and
    the training circuitry is arranged to store the resolved behaviour of an instance of the given control flow instruction in multiple cache entries using associated tag values generated using different chosen pointers from the plurality of pointers, and to reference the multiple cache entries during the training process when seeking to determine whether there is a pointer whose pointer value increments in a manner that meets the correlation threshold.

3. An apparatus as in Clause 1 or Clause 2, wherein the behaviour record provides a vector of elements, where each element is for storing a resolved behaviour, and during access to the behaviour record a pointer value of the associated pointer is used to identify one of the elements in the vector of elements.

4. An apparatus as in any preceding clause, wherein the behaviour record is populated when the prediction entry is allocated, by retrieving from the cache circuitry the resolved behaviour for one or more instances of the given control flow instruction.

5. An apparatus as in any of clauses 1 to 3, wherein the behaviour record is populated after the prediction entry has been allocated, using the resolved behaviour for one or more subsequently observed instances of the given control flow instruction.

6. An apparatus as in any preceding clause, wherein the prediction entry maintains a confidence value, and generation by the prediction circuitry of the predicted behaviour of the given instance of the given control flow instruction in response to the prediction trigger requires the confidence value to exceed a confidence threshold.

7. An apparatus as in Clause 6, wherein when the prediction entry is allocated, the confidence value is initialised to a given value.

8. An apparatus as in Clause 6 or Clause 7, wherein the prediction circuitry is arranged to update the confidence value and the behaviour record based on the resolved behaviour for one or more subsequently observed instances of the given control flow instruction.

9. An apparatus as in any preceding clause when dependent on Clause 2, further comprising:
    tag value generation circuitry to generate the associated tag value in dependence on an identifier of the chosen pointer, a current pointer value of the chosen pointer, and an identifier for the control flow instruction for which the associated tag value is being generated.

10. An apparatus as in Clause 9, wherein the identifier for the control flow instruction for which the associated tag value is being generated comprises an identifier of the tracker entry used to identify the control flow instruction.

11. An apparatus as in any preceding clause, wherein:
    each tracker entry is arranged to identify a current active pointer to be associated with the control flow instruction identified by that tracker entry and an active pointer confidence indication for the current active pointer, wherein the current active pointer is selected from amongst the plurality of pointers; and the correlation threshold is determined to be met when the active pointer confidence indication indicates that a given threshold confidence level has been met for the current active pointer.

12. An apparatus as in Clause 11, wherein:

each tracker entry is further arranged to identify a current training pointer to be associated with the control flow instruction identified by that tracker entry and a training pointer confidence indication for the current training pointer, wherein the current training pointer is selected from amongst the plurality of pointers; and for the given control flow instruction, the resolved behaviour of a given instance of that given control flow instruction is allocated into a first cache entry along with a first associated tag value generated in dependence on the current active pointer and into a second cache entry along with a second associated tag value generated in dependence on the current training pointer.

13. An apparatus as in Clause 12, wherein following elapse of a training period, the tracker circuitry is arranged to determine whether the training pointer confidence indication indicates a confidence that is greater by a given margin than is indicated by the active pointer confidence indication, and in that event to update the given tracker entry to identify the current training pointer as being a new current active pointer.

14. An apparatus as in Clause 13, wherein the promotion circuitry is arranged, responsive to the tracker circuitry updating the given tracker entry to identify the new current active pointer, to perform an update evaluation process in order to determine whether to update the prediction circuitry.

15. An apparatus as in Clause 14, wherein the update evaluation process comprises:

determining whether the confidence indication associated with the new current active pointer indicates that the correlation threshold has been met;

when the correlation threshold is determined to have been met, determining whether a prediction entry has already been allocated for the given control flow instruction, and when a prediction entry has already been allocated for the given control flow instruction, updating the allocated prediction entry to identify the new current active pointer for the given control flow instruction;

when the prediction entry has not yet been allocated for the given control flow instruction, allocating a prediction entry to identify the given control flow instruction and the new current active pointer.

16. An apparatus as in any of clauses 11 to 15, wherein the promotion circuitry is arranged to invalidate the prediction entry allocated in the prediction circuitry for the given control flow instruction in the event that the active pointer confidence indication maintained in the given tracker entry of the training circuitry for the given control flow instruction drops below a given minimal threshold level.

17. An apparatus as in any preceding clause, further comprising power control circuitry to selectively switch the apparatus between different power modes of operation in response to at least one power mode transition trigger.

18. An apparatus as in Clause 17, wherein the different power modes of operation comprise at least two of the following power modes:

a full power mode where the training circuitry is arranged to perform the training process with reference to all of the plurality of pointers;

a reduced power mode where the training circuitry is arranged to perform the training process with reference to only a subset of the plurality of pointers; and a low power mode where the training circuitry is not used, the prediction circuitry is arranged to allocate a prediction entry for the given control flow instruction in response to a misprediction level being detected for the given control flow instruction using a default prediction mechanism, and the prediction circuitry is arranged to select a predetermined pointer as the associated pointer identified in the prediction entry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

pointer storage to store pointer values for a plurality of pointers;

increment circuitry, responsive to a series of increment events, to differentially increment the pointer values of the pointers;

training circuitry comprising tracker circuitry to maintain a plurality of tracker entries and cache circuitry to maintain a plurality of cache entries, each tracker entry to identify a control flow instruction, and each cache entry to store a resolved behaviour of an instance of a control flow instruction identified by a tracker entry of the tracker circuitry;

wherein the training circuitry is arranged, for a given control flow instruction identified in a given tracker entry, to perform a training process to seek to determine, as an associated pointer for the given control flow instruction, a pointer from amongst the plurality of pointers whose pointer value increments in a manner that meets a correlation threshold with occurrence of instances of the given control flow instruction;

prediction circuitry; and promotion circuitry, responsive to detection of the correlation threshold being met for the given control flow instruction, to allocate a prediction entry within the prediction circuitry to identify the given control flow instruction and the associated pointer, and to establish within the prediction entry a behaviour record identifying the resolved behaviour for one or more instances of the given control flow instruction, where the behaviour record is arranged such that each resolved behaviour is associated with the pointer value of the associated pointer at the time that resolved behaviour was observed;

wherein the prediction circuitry, responsive to a prediction trigger associated with a replay of a given instance of the given control flow instruction, is arranged to determine, in dependence on a current pointer value of the associated pointer, a predicted behaviour of the given instance of the given control flow instruction from the behaviour record within the prediction entry.

2. An apparatus as claimed in claim 1, wherein:
each cache entry is arranged to store a resolved behaviour of an instance of a control flow instruction identified by a tracker entry of the tracker circuitry along with an associated tag value generated in dependence on a chosen pointer when the resolved behaviour was allocated into that cache entry; and
the training circuitry is arranged to store the resolved behaviour of an instance of the given control flow instruction in multiple cache entries using associated tag values generated using different chosen pointers from the plurality of pointers, and to reference the multiple cache entries during the training process when seeking to determine whether there is a pointer whose pointer value increments in a manner that meets the correlation threshold.

3. An apparatus as claimed in claim 1, wherein the behaviour record provides a vector of elements, where each element is for storing a resolved behaviour, and during access to the behaviour record a pointer value of the associated pointer is used to identify one of the elements in the vector of elements.

4. An apparatus as claimed in claim 1, wherein the behaviour record is populated when the prediction entry is allocated, by retrieving from the cache circuitry the resolved behaviour for one or more instances of the given control flow instruction.

5. An apparatus as claimed in claim 1, wherein the behaviour record is populated after the prediction entry has been allocated, using the resolved behaviour for one or more subsequently observed instances of the given control flow instruction.

6. An apparatus as claimed in claim 1, wherein the prediction entry maintains a confidence value, and generation by the prediction circuitry of the predicted behaviour of the given instance of the given control flow instruction in response to the prediction trigger requires the confidence value to exceed a confidence threshold.

7. An apparatus as claimed in claim 6, wherein the prediction circuitry is arranged to update the confidence value and the behaviour record based on the resolved behaviour for one or more subsequently observed instances of the given control flow instruction.

8. An apparatus as claimed in claim 2, further comprising:
tag value generation circuitry to generate the associated tag value in dependence on an identifier of the chosen pointer, a current pointer value of the chosen pointer, and an identifier for the control flow instruction for which the associated tag value is being generated.

9. An apparatus as claimed in claim 8, wherein the identifier for the control flow instruction for which the associated tag value is being generated comprises an identifier of the tracker entry used to identify the control flow instruction.

10. An apparatus as claimed in claim 1, wherein:
each tracker entry is arranged to identify a current active pointer to be associated with the control flow instruction identified by that tracker entry and an active pointer confidence indication for the current active pointer, wherein the current active pointer is selected from amongst the plurality of pointers; and
the correlation threshold is determined to be met when the active pointer confidence indication indicates that a given threshold confidence level has been met for the current active pointer.

11. An apparatus as claimed in claim 10, wherein:
each tracker entry is further arranged to identify a current training pointer to be associated with the control flow instruction identified by that tracker entry and a training pointer confidence indication for the current training pointer, wherein the current training pointer is selected from amongst the plurality of pointers; and
for the given control flow instruction, the resolved behaviour of a given instance of that given control flow instruction is allocated into a first cache entry along with a first associated tag value generated in dependence on the current active pointer and into a second cache entry along with a second associated tag value generated in dependence on the current training pointer.

12. An apparatus as claimed in claim 11, wherein following elapse of a training period, the tracker circuitry is arranged to determine whether the training pointer confidence indication indicates a confidence that is greater by a given margin than is indicated by the active pointer confidence indication, and in that event to update the given tracker entry to identify the current training pointer as being a new current active pointer.

13. An apparatus as claimed in claim 12, wherein the promotion circuitry is arranged, responsive to the tracker circuitry updating the given tracker entry to identify the new current active pointer, to perform an update evaluation process in order to determine whether to update the prediction circuitry.

14. An apparatus as claimed in claim 13, wherein the update evaluation process comprises:
determining whether the confidence indication associated with the new current active pointer indicates that the correlation threshold has been met;
when the correlation threshold is determined to have been met, determining whether a prediction entry has already been allocated for the given control flow instruction, and
when a prediction entry has already been allocated for the given control flow instruction, updating the allocated prediction entry to identify the new current active pointer for the given control flow instruction;
when the prediction entry has not yet been allocated for the given control flow instruction, allocating a prediction entry to identify the given control flow instruction and the new current active pointer.

15. An apparatus as claimed in claim 1, further comprising power control circuitry to selectively switch the apparatus between different power modes of operation in response to at least one power mode transition trigger.

16. An apparatus as claimed in claim 15, wherein the different power modes of operation comprise at least two of the following power modes:
- a full power mode where the training circuitry is arranged to perform the training process with reference to all of the plurality of pointers;
- a reduced power mode where the training circuitry is arranged to perform the training process with reference to only a subset of the plurality of pointers; and
- a low power mode where the training circuitry is not used, the prediction circuitry is arranged to allocate a prediction entry for the given control flow instruction in response to a misprediction level being detected for the given control flow instruction using a default prediction mechanism, and the prediction circuitry is arranged to select a predetermined pointer as the associated pointer identified in the prediction entry.

17. A method of predicting behaviour of control flow instructions, comprising:
- maintaining pointer values for a plurality of pointers and, responsive to a series of increment events, differentially increment the pointer values of the pointers;
- employing training circuitry comprising tracker circuitry to maintain a plurality of tracker entries and cache circuitry to maintain a plurality of cache entries, each tracker entry for identifying a control flow instruction, and each cache entry for storing a resolved behaviour of an instance of a control flow instruction identified by a tracker entry of the tracker circuitry;
- performing a training process, for a given control flow instruction identified in a given tracker entry, to seek to determine, as an associated pointer for the given control flow instruction, a pointer from amongst the plurality of pointers whose pointer value increments in a manner that meets a correlation threshold with occurrence of instances of the given control flow instruction;
- responsive to detection of the correlation threshold being met for the given control flow instruction, allocating a prediction entry within prediction circuitry to identify the given control flow instruction and the associated pointer, and establishing within the prediction entry a behaviour record identifying the resolved behaviour for one or more instances of the given control flow instruction, where the behaviour record is arranged such that each resolved behaviour is associated with the pointer value of the associated pointer at the time that resolved behaviour was observed; and
- employing the prediction circuitry, responsive to a prediction trigger associated with a replay of a given instance of the given control flow instruction, to determine, in dependence on a current pointer value of the associated pointer, a predicted behaviour of the given instance of the given control flow instruction from the behaviour record within the prediction entry.

18. A non-transitory computer-readable medium to store computer-readable code for fabrication of a data processing apparatus comprising:
- pointer storage to store pointer values for a plurality of pointers;
- increment circuitry, responsive to a series of increment events, to differentially increment the pointer values of the pointers;
- training circuitry comprising tracker circuitry to maintain a plurality of tracker entries and cache circuitry to maintain a plurality of cache entries, each tracker entry to identify a control flow instruction, and each cache entry to store a resolved behaviour of an instance of a control flow instruction identified by a tracker entry of the tracker circuitry;
- wherein the training circuitry is arranged, for a given control flow instruction identified in a given tracker entry, to perform a training process to seek to determine, as an associated pointer for the given control flow instruction, a pointer from amongst the plurality of pointers whose pointer value increments in a manner that meets a correlation threshold with occurrence of instances of the given control flow instruction;
- prediction circuitry; and
- promotion circuitry, responsive to detection of the correlation threshold being met for the given control flow instruction, to allocate a prediction entry within the prediction circuitry to identify the given control flow instruction and the associated pointer, and to establish within the prediction entry a behaviour record identifying the resolved behaviour for one or more instances of the given control flow instruction, where the behaviour record is arranged such that each resolved behaviour is associated with the pointer value of the associated pointer at the time that resolved behaviour was observed;
- wherein the prediction circuitry, responsive to a prediction trigger associated with a replay of a given instance of the given control flow instruction, is arranged to determine, in dependence on a current pointer value of the associated pointer, a predicted behaviour of the given instance of the given control flow instruction from the behaviour record within the prediction entry.

19. A system comprising:
- the apparatus according to claim 1, implemented in at least one packaged chip;
- at least one system component; and
- a board,
- wherein the at least one packaged chip and the at least one system component are assembled on the board.

20. A chip-containing product comprising the system according to claim 19, assembled on a further board with at least one other product component.

* * * * *